US011989104B2

(12) United States Patent
Cheraghi et al.

(10) Patent No.: US 11,989,104 B2
(45) Date of Patent: May 21, 2024

(54) TECHNIQUES FOR FAULT DETECTION IN WIRELESS COMMUNICATIONS SYSTEMS

(71) Applicant: QUALCOMM Incorporated, San Diego, CA (US)

(72) Inventors: Parisa Cheraghi, San Diego, CA (US); Gene Wesley Marsh, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 783 days.

(21) Appl. No.: 17/069,437

(22) Filed: Oct. 13, 2020

(65) Prior Publication Data

US 2022/0114063 A1 Apr. 14, 2022

(51) Int. Cl.
| | |
|---|---|
| G06F 11/16 | (2006.01) |
| G06F 11/14 | (2006.01) |
| H04L 9/40 | (2022.01) |
| H04L 43/16 | (2022.01) |
| H04W 4/38 | (2018.01) |

(Continued)

(52) U.S. Cl.
CPC ...... *G06F 11/1608* (2013.01); *G06F 11/1471* (2013.01); *G06F 11/1633* (2013.01); *H04L 43/16* (2013.01); *H04L 63/12* (2013.01); *H04L 63/123* (2013.01); *H04W 4/38* (2018.02); *H04W 4/40* (2018.02); *H04W 76/10* (2018.02); *G06F 2201/82* (2013.01)

(58) Field of Classification Search
CPC ............ G06F 11/1608; G06F 11/1629; G06F 11/1633; G06F 11/1471; G06F 2201/82; H04L 43/16; H04L 63/12; H04L 63/123; H04L 67/125; H04L 69/40; H04W 4/38; H04W 4/40; H04W 76/10; H04W 4/46; H04W 4/42; H04W 4/44; H04W 4/48
See application file for complete search history.

(56) References Cited

U.S. PATENT DOCUMENTS 9,300,677 B2 3/2016 Dewey et al.
2006/0162986 A1* 7/2006 Disser ................ G06F 11/1633
180/402

(Continued)

OTHER PUBLICATIONS

International Search Report and Written Opinion—PCT/US2021/050288—ISA/EPO—dated Mar. 21, 2022.

(Continued)

*Primary Examiner* — Steve N Nguyen
(74) *Attorney, Agent, or Firm* — Dalei Dong; Holland & Hart LLP

(57) ABSTRACT

Methods, systems, and devices for wireless communications are described. The described techniques provide for a first device to perform data validation with one or more other devices. For example, a device may generate data at components associated with the device. To validate at least a portion of the data, the device may establish a connection with other devices. In some examples, the device may determine a portion of the data to validate based on a capability of the other devices to generate data that corresponds to the portion of data. The device may exchange data with the other devices and determine a validity of data generated at the device in response.

19 Claims, 18 Drawing Sheets

(51) Int. Cl.
*H04W 4/40* (2018.01)
*H04W 76/10* (2018.01)

(56) References Cited

U.S. PATENT DOCUMENTS

| | | |
|---|---|---|
| 2007/0027603 A1* | 2/2007 | Katrak ................ G06F 11/1608 |
| | | 701/70 |
| 2017/0206238 A1 | 7/2017 | Coutinho et al. |
| 2018/0053403 A1* | 2/2018 | Wieskamp ............ G01S 13/931 |
| 2018/0295112 A1* | 10/2018 | Coppola ................. H04W 4/48 |
| 2020/0045517 A1* | 2/2020 | Park ........................ H04W 4/12 |
| 2020/0174493 A1 | 6/2020 | Lin et al. |
| 2020/0286197 A1 | 9/2020 | Stivi et al. |

OTHER PUBLICATIONS

Partial International Search Report—PCT/US2021/050288—ISA/EPO—dated Jan. 5, 2022.

\* cited by examiner

TECHNIQUES FOR FAULT DETECTION IN WIRELESS COMMUNICATIONS SYSTEMS

FIELD OF DISCLOSURE

The following relates to wireless communications, including techniques for fault detection in wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support vehicle-to-everything (V2X) services and may include devices that support perceptive networks where one or more components are used to determine aspects of an environment. In some cases, one or more components may experience a fault such that data produced by the components is inaccurate.

SUMMARY

The described techniques relate to improved methods, systems, devices, and apparatuses that support techniques for fault detection in wireless communications systems. The described techniques provide for a first device to perform data validation with one or more other devices. For example, a device may generate data at components associated with the device. To validate at least a portion of the data, the device may establish a connection with other devices. In some examples, the device may determine a portion of the data to validate based on a capability of the other devices to generate data that corresponds to the portion of data. The device may exchange data with the other devices and determine a validity of data generated at the device in response.

A method of wireless communications at a first device is described. The method may include generating a first set of data associated with a set of components of the first device, establishing, with one or more other devices, a connection for validation of data generated at the set of components, determining at least a subset of the first set of data for validation based on a capability of the one or more other devices to generate one or more other sets of data corresponding to the first set of data, transmitting the subset of the first set of data to the one or more other devices, receiving, from the one or more other devices, at least one other set of data corresponding to the subset of the first set of data, and determining a validity of the subset of the first set of data in response to receiving at least the one other set of data.

An apparatus for wireless communications at a first device is described. The apparatus may include a processor, memory coupled with the processor, and instructions stored in the memory. The instructions may be executable by the processor to cause the apparatus to generate a first set of data associated with a set of components of the first device, establish, with one or more other devices, a connection for validation of data generated at the set of components, determine at least a subset of the first set of data for validation based on a capability of the one or more other devices to generate one or more other sets of data corresponding to the first set of data, transmit the subset of the first set of data to the one or more other devices, receive, from the one or more other devices, at least one other set of data corresponding to the subset of the first set of data, and determine a validity of the subset of the first set of data in response to receiving at least the one other set of data.

Another apparatus for wireless communications at a first device is described. The apparatus may include means for generating a first set of data associated with a set of components of the first device, establishing, with one or more other devices, a connection for validation of data generated at the set of components, determining at least a subset of the first set of data for validation based on a capability of the one or more other devices to generate one or more other sets of data corresponding to the first set of data, transmitting the subset of the first set of data to the one or more other devices, receiving, from the one or more other devices, at least one other set of data corresponding to the subset of the first set of data, and determining a validity of the subset of the first set of data in response to receiving at least the one other set of data.

A non-transitory computer-readable medium storing code for wireless communications at a first device is described. The code may include instructions executable by a processor to generate a first set of data associated with a set of components of the first device, establish, with one or more other devices, a connection for validation of data generated at the set of components, determine at least a subset of the first set of data for validation based on a capability of the one or more other devices to generate one or more other sets of data corresponding to the first set of data, transmit the subset of the first set of data to the one or more other devices, receive, from the one or more other devices, at least one other set of data corresponding to the subset of the first set of data, and determine a validity of the subset of the first set of data in response to receiving at least the one other set of data.

Some examples of the method, apparatuses, and non-transitory computer-readable medium described herein may further include operations, features, means, or instructions for determining the first set of data may be invalid, transmitting, to the one or more other devices, an indication that the first set of data may be invalid, and transmitting, to the one or more devices, a request to initiate data sharing.

Some examples of the method, apparatuses, and non-transitory computer-readable medium described herein may further include operations, features, means, or instructions for determining the first set of data may be valid, and transmitting, to the one or more other devices, an indication that the first set of data may be valid.

Some examples of the method, apparatuses, and non-transitory computer-readable medium described herein may further include operations, features, means, or instructions for determining at least one component of the set of components may be experiencing a failure, where the first set of data may be associated with at least the one component, and determining a second set of data associated with one or more other components of the set of components, where determining the validity of the first set of data may be based on the second set of data.

Some examples of the method, apparatuses, and non-transitory computer-readable medium described herein may further include operations, features, means, or instructions for dividing the set of components at the first device into one or more sets of components, where the first set of data may be generated at a first set of components.

In some examples of the method, apparatuses, and non-transitory computer-readable medium described herein, determining the validity of the first set of data may include operations, features, means, or instructions for determining whether one or more parameters associated with the first set of data satisfy a threshold.

In some examples of the method, apparatuses, and non-transitory computer-readable medium described herein, the one or more parameters include one or more of a latency parameter or a quality of service parameter.

In some examples of the method, apparatuses, and non-transitory computer-readable medium described herein, establishing the connection may include operations, features, means, or instructions for establishing a vehicle-to-everything connection with the one or more other devices.

A method of wireless communications at a first device is described. The method may include receiving, from a second device, a first set of data generated at the second device, receiving, from the second device, an indication that the first set of data is invalid, ignoring the first set of data based on the indication that the first set of data is invalid, and transmitting, to the second device, an indication of an availability of the first device to perform data sharing with the second device.

An apparatus for wireless communications at a first device is described. The apparatus may include a processor, memory coupled with the processor, and instructions stored in the memory. The instructions may be executable by the processor to cause the apparatus to receive, from a second device, a first set of data generated at the second device, receive, from the second device, an indication that the first set of data is invalid, ignore the first set of data based on the indication that the first set of data is invalid, and transmit, to the second device, an indication of an availability of the first device to perform data sharing with the second device.

Another apparatus for wireless communications at a first device is described. The apparatus may include means for receiving, from a second device, a first set of data generated at the second device, receiving, from the second device, an indication that the first set of data is invalid, ignoring the first set of data based on the indication that the first set of data is invalid, and transmitting, to the second device, an indication of an availability of the first device to perform data sharing with the second device.

A non-transitory computer-readable medium storing code for wireless communications at a first device is described. The code may include instructions executable by a processor to receive, from a second device, a first set of data generated at the second device, receive, from the second device, an indication that the first set of data is invalid, ignore the first set of data based on the indication that the first set of data is invalid, and transmit, to the second device, an indication of an availability of the first device to perform data sharing with the second device.

Some examples of the method, apparatuses, and non-transitory computer-readable medium described herein may further include operations, features, means, or instructions for determining a second set of data for validating the first set of data based on a capability of the first device to validate the first set of data, and transmitting the second set of data to the second device.

Some examples of the method, apparatuses, and non-transitory computer-readable medium described herein may further include operations, features, means, or instructions for receiving, from the second device, a request to perform data sharing, and performing data sharing with the second device in response to receiving the request.

A method of wireless communications at a first device is described. The method may include receiving, from a second device, an indication that a first set of data generated at the second device is invalid, determining one or more other devices available for data sharing with the second device in response to receiving the indication, transmitting, to the second device, an indication of an availability of the one or more other devices to perform data sharing with the second device, and transmitting, to the one or more other devices, the indication that the first set of data generated at the second device is invalid and a request for the one or more other devices to perform data sharing with the second device.

An apparatus for wireless communications at a first device is described. The apparatus may include a processor, memory coupled with the processor, and instructions stored in the memory. The instructions may be executable by the processor to cause the apparatus to receive, from a second device, an indication that a first set of data generated at the second device is invalid, determine one or more other devices available for data sharing with the second device in response to receiving the indication, transmit, to the second device, an indication of an availability of the one or more other devices to perform data sharing with the second device, and transmit, to the one or more other devices, the indication that the first set of data generated at the second device is invalid and a request for the one or more other devices to perform data sharing with the second device.

Another apparatus for wireless communications at a first device is described. The apparatus may include means for receiving, from a second device, an indication that a first set of data generated at the second device is invalid, determining one or more other devices available for data sharing with the second device in response to receiving the indication, transmitting, to the second device, an indication of an availability of the one or more other devices to perform data sharing with the second device, and transmitting, to the one or more other devices, the indication that the first set of data generated at the second device is invalid and a request for the one or more other devices to perform data sharing with the second device.

A non-transitory computer-readable medium storing code for wireless communications at a first device is described. The code may include instructions executable by a processor to receive, from a second device, an indication that a first set of data generated at the second device is invalid, determine one or more other devices available for data sharing with the second device in response to receiving the indication, transmit, to the second device, an indication of an availability of the one or more other devices to perform data sharing with the second device, and transmit, to the one or more other devices, the indication that the first set of data generated at the second device is invalid and a request for the one or more other devices to perform data sharing with the second device.

Some examples of the method, apparatuses, and non-transitory computer-readable medium described herein may further include operations, features, means, or instructions for receiving the first set of data from the second device, determining a second set of data for validating the first set of data based on a capability of the first device to validate the first set of data, and transmitting the second set of data to the second device.

Some examples of the method, apparatuses, and non-transitory computer-readable medium described herein may further include operations, features, means, or instructions for receiving, from the second device, a request to perform data sharing, and performing data sharing with the second device in response to receiving the request.

DETAILED DESCRIPTION

Figure 1:
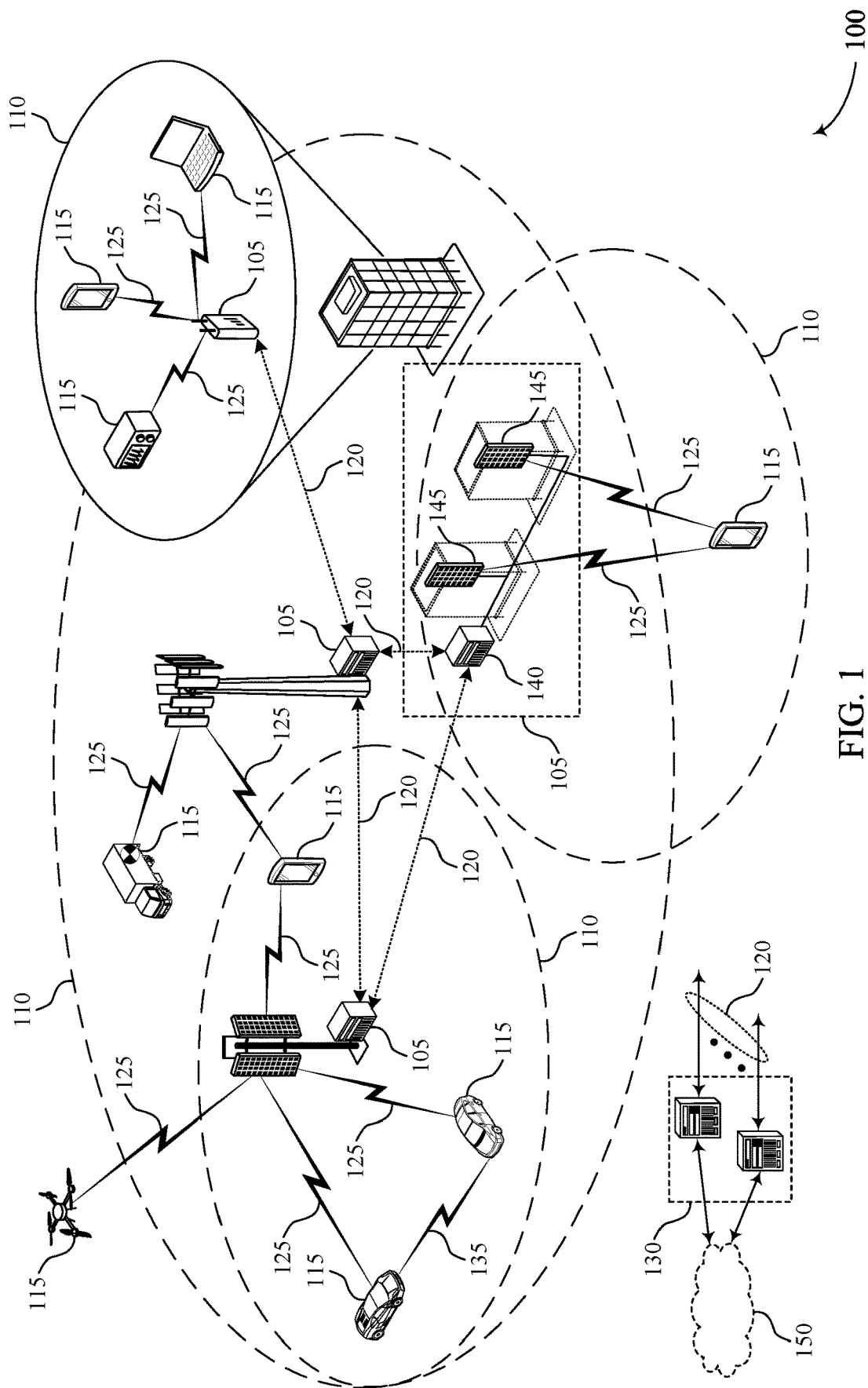
FIG. 1 illustrates an example of a wireless communications system that supports techniques for fault detection in wireless communications systems in accordance with aspects of the present disclosure.

Some wireless communications may support vehicle-to-everything (V2X) services where devices (e.g., user equipments (UEs), vehicles, roadside units, base stations, etc.) share information to establish a perceptive network. A perceptive network may be a network in which devices share information generated by sensors at each device to enable the devices to observe or perceive an environment. For example, a device may include components (e.g., sensors) which generate data corresponding to aspects of an environment. Devices may use such data to observe or perceive the environment via the perceptive network. In some cases, perceptive networks may allow for increased safety, efficient communications, driver assistance, or infotainment services, among other benefits. However, perceptive networks, or the devices operating therein, may be susceptible to data faults or component failures resulting in inaccurate data, which may lead to decreased safety conditions, a loss of service, etc.

A technique for detecting faults and validating data generated by components associated with devices in a perceptive network is described herein. The present technique may include a first UE establishing a data validation connection (e.g., a V2X data validation session) with other UEs to validate data generated by sensors associated with the first UE. For example, the UE may include sensors used to generate data corresponding to different aspects of an environment and may establish data validation sessions with other UEs to validate the data. In some examples, the first UE may determine which other UEs to connect to and which data to validate based on a capability of the other UEs to generate data that corresponds to a same aspect of an environment as data generated by sensors at the first UE. For example, data generated by sensors at the first UE may correspond to a particular location, direction, etc. If that data needs to be validated, the first UE may select other UEs that are able to generate data corresponding to the same location, direction, etc. The first UE may transmit data to at least one of the other UEs and, in response, receive other data that corresponds to a same aspect of the environment. The first UE may determine whether the data generated at the first UE is valid based on data received from the other UEs. For example, based on a received set of data (e.g., by comparing the data), the first UE may determine that the portion of data generated by sensors associated with the first UE does or does not satisfy thresholds associated with quality of service, latency, accuracy, error rate, or other parameters. If the first UE determines that the portion of data has a fault (e.g., is inaccurate because it does not satisfy the thresholds), the first device may transmit an indication of the invalid data to the other UEs. Additionally or alternatively, the first UE may request to perform data sharing with the other UEs to mitigate the effects of the data fault.

In some implementations, the first UE may detect a fault or failure (e.g., a power failure, a communications failure, etc.) in sensors associated with the first UE. In response, the first UE may determine other sensors which may generate data corresponding to data generated at the failed sensors. For example, the first UE may divide sensors associated with the first UE into different sections that each correspond to a different aspect (e.g., location, direction, etc.) of an environment. If a sensor in a section experiences a failure, the first UE may use data generated by other sensors in the section to validate data from the failed sensor.

Particular aspects of the present disclosure may be implemented to realize one or more potential advantages. For example, the described techniques include features which provide for fault detection and data validation in V2X perceptive networks. Based on the techniques for data validation, a wireless communications system may experience increased efficiency, an increased reliability for communications and infotainment services, or increased safety conditions, among other benefits.

Aspects of the disclosure are initially described in the context of wireless communications systems. Aspects of the disclosure are further described in the context of a device diagram and process flows. Aspects of the disclosure are further illustrated by and described with reference to apparatus diagrams, system diagrams, and flowcharts that relate to techniques for fault detection in wireless communications systems.

FIG. 1 illustrates an example of a wireless communications system 100 that supports techniques for fault detection in wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using V2X communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, in which a wireless communications system 100 supports V2X communications, multiple devices (e.g., UEs 115, base stations 105, roadside units, etc.) may support perceptive networks in which devices share information corresponding to aspects of an environment. For example, UEs 115 (e.g., vehicles), base stations 105, or roadside units may include components configured to generate data corresponding to the environment and may share data to assist other devices to observe or perceive the environment. In some examples, devices in a perceptive network may experience data faults or component failures which may lead to inaccurate data being shared via the network. To mitigate the effects of data faults or component failures, devices in the network (e.g., UEs 115, base stations 105, roadside units, etc.) may perform data validation procedures with other devices in the network.

Figure 2:
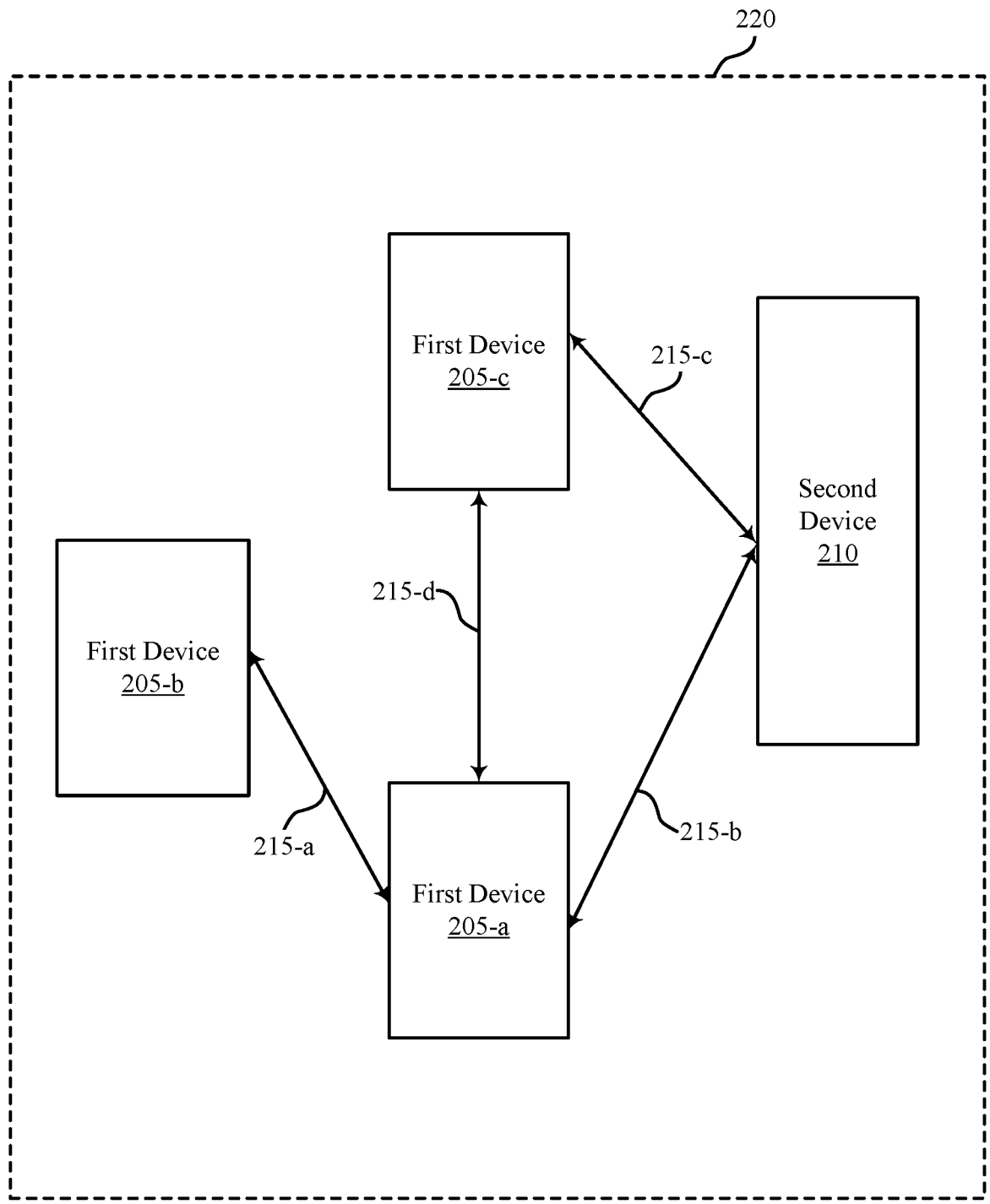
FIG. 2 illustrates an example of a wireless communications system that supports techniques for fault detection in wireless communications systems in accordance with aspects of the present disclosure.

FIG. 2 illustrates an example of a wireless communications system 200 that supports techniques for fault detection in wireless communications systems in accordance with aspects of the present disclosure. In some examples, the wireless communications system 200 may implement aspects of a wireless communication system 100 as described with reference to FIG. 1. The wireless communications system 200 may include a first device 205-a, a first device 205-b, and a first device 205-b, which may be examples of a UE 115 (e.g., a vehicle) as described with reference to FIG. 1. The wireless communications system 200 may also include a second device 210 which, in some implementations, may be an example of a base station 105 (e.g., a roadside unit) as described with reference to FIG. 1. The first devices 205-a, 205-b, 205-c, and 210 may share information via one or more links 215.

In some implementations, the wireless communications system 200 may support perceptive networks via V2X services. As such, the first devices 205-a, 205-b, 205-c and 210 may support sharing information to observe or perceive an environment 220. For example, each of first devices 205-a, 205-b, 205-c, and 210 may include components (e.g., sensors) configured to generate data corresponding to aspects of the environment 220. However, such components may be susceptible to failure, leading to inaccurate data being shared between the first devices 205-a, 205-b, 205-c, and 210. To mitigate the effects of data faults, devices in the wireless communications system 200 may perform data validation and sharing procedures.

For example, the first device 205-a may generate data at components associated with the first device 205-a. If the first device 205-a detects a component failure or potential data fault (e.g., through an electronic control unit), the first device 205-a may establish a data validation session with the first device 205-b via the link 215-a. The first device 205-a may determine a portion of the generated data to validate via the data validation session established with the first device 205-b. In some examples, the first device 205-a may determine the portion of data for validation based on a capability of the first device 205-b to generate data that corresponds to at least a same aspect of the environment 220 as the portion of data. The first device 205-a may transmit the portion of data to the first device 205-b and the first device 205-b may generate and transmit a corresponding other set of data. In response to receiving the other data from the first device 205-b, the first device 205-a may determine a validity of data generated at components associated with the first device 205-a. For example, the first device 205-a may determine whether the portion of data satisfies one or more thresholds associated with latency, accuracy, error rate, etc. based on the data received from the first device 205-b. Additionally or alternatively, in some examples, the first device 205-a may validate data generated at components associated with the first device 205-a using data generated by other components associated with the first device 205-a. For example, if the first device 205-a detects that a component is experiencing a failure, the first device 205-a may valid data generated by the component using data generated by other components associated with the first device 205-a.

If the first device 205-a determines that the portion of data is valid, the first device 205-a may transmit an indication of validity to the first device 205-b. If the first device 205-a determines that the portion of data is invalid (e.g., has a fault), the first device 205-a may transmit an indication of invalidity to the first device 205-b. Additionally or alternatively, the first device 205-a may transmit a request for data sharing to the first device 205-b. In response, the first device 205-a and the first device 205-b may perform data sharing techniques to mitigate effects of the invalid data at the first device 205-a. In some examples, the first device 205-b may ignore data received from the first device 205-a in response to receiving an indication that data generated at the first device 205-b has a fault. In some examples, the first device 205-a may provide an indication to a user of the first device 205-a that data generated at the first device 205-a has fault. In some examples, the first device 205-a may detect a potential fault in data received form the first device 205-a and may establish a data validation session in response. Although described with reference to the first devices 205-a and 205-b, it is noted that the first device 205-a may perform data validation with the first device 205-c, the second device 210, or any combination of devices associated with the wireless communications system 200.

In some examples, the first device 205-a may transmit an indication of a data fault to the second device 210. In response, the second device 210 may determine other devices available for data sharing with the first device 205-a. For example, the second device 210 may determine the first device 205-c is available to share data with the first device 205-a to mitigate effects of the data fault detected at the first device 205-a. The second device 210 may transmit to the first device 205-a, via a link 215-c, a request for the first device 205-c to perform data sharing with the first device 205-a. Similarly, the second device 210 may transmit an indication to the first device 205-a that the first device 205-c is available for data sharing. In response, the first device 205-a and the first device 205-c may perform data sharing to mitigate effects of the data fault detected at the first device 205-a. Implementing aspects of the present disclosure may allow devices in the wireless communications system 200 to detect faults and validate data associated with V2X perceptive networks, leading to an increased reliability of communications services.

Figure 3:
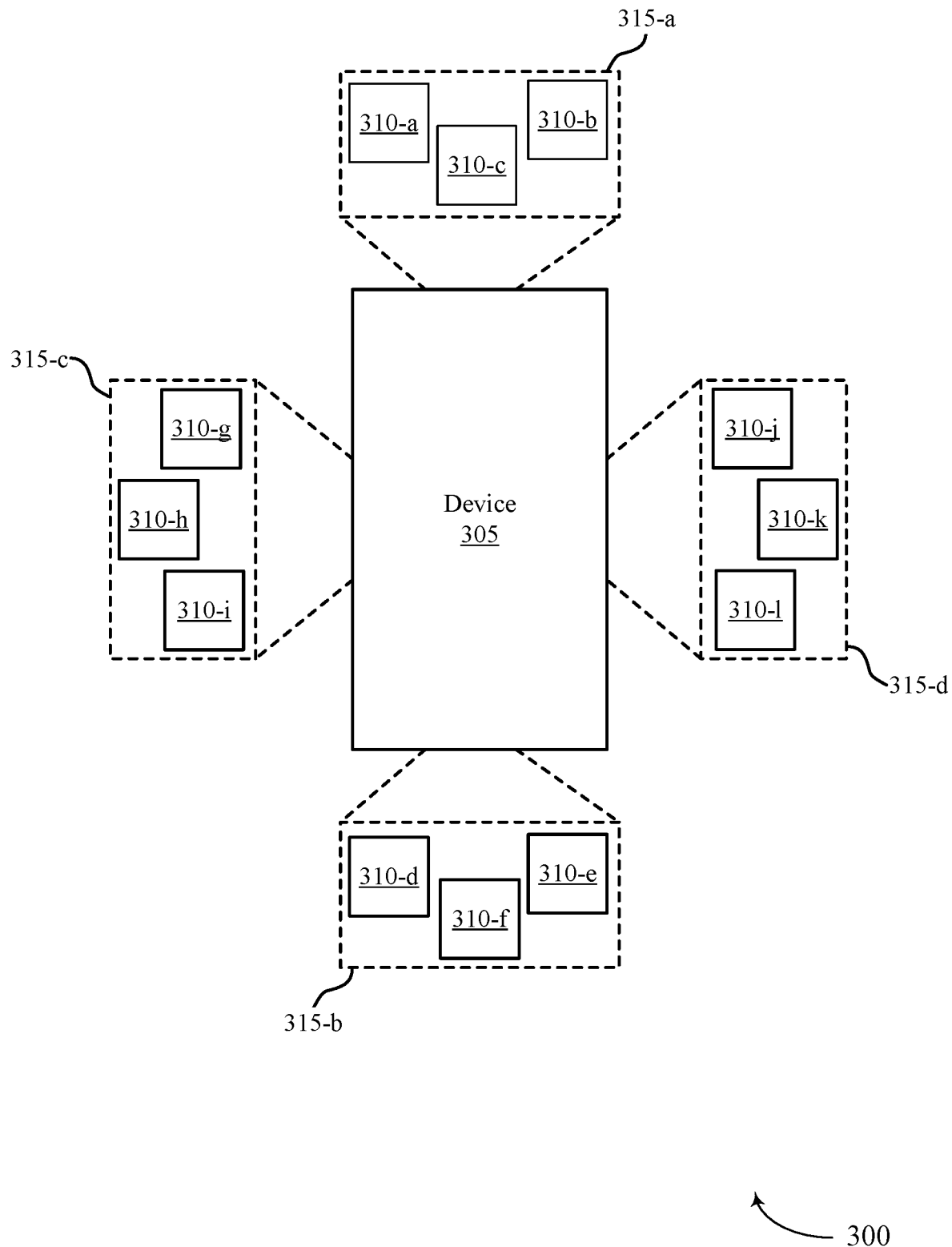
FIG. 3 shows a diagram of an example device that supports techniques for fault detection in wireless communications systems in accordance with aspects of the present disclosure.

FIG. 3 shows a diagram 300 of an example device 305 that supports techniques for fault detection in wireless communications systems in accordance with aspects of the present disclosure. In some examples, the device 305 may implement aspects of a wireless communication system 100 or 200 as described with reference to FIGS. 1 and 2. The device 305 may be an example of a device (e.g., a UE 115 as shown in FIG. 1) that supports V2X perceptive networks and includes one or more components 310. In some examples, the components 310 may be examples of sensors (e.g., cameras, radars, etc.) configured to generate data corresponding to aspects of an environment associated with the device 305. In some implementations, the components 310 may be associated with or controlled via an electronic control unit. In some example, the device may perform fault detection and data validation techniques described with reference to FIG. 2.

In some examples, the device 305 may divide components 310 into different sections 315. For example, a section 315-*a* may include components 310-*a*, 310-*b* and 310-*c*, a section 315-*b* may include components 310-*d*, 310-*f*, and 310-*e*, a section 315-*c* may include components 310-*g*, 310-*h*, and 310-*i*, and a section 315-*d* may include components 310-*j*, 310-*k*, and 310-*j*. Different sections 315 may correspond to different aspects of a surrounding environment. In some examples, in which the device 305 is an example of a vehicle, the section 315-*a* may correspond to a front of the vehicle, the section 315-*b* may correspond to a back of the vehicle, and the sections 315-*c* and 315-*d* may correspond to the driver and passenger sides of the vehicle, respectively. In some examples, the device 305 may divide the components 310 into the sections 315 to increase an efficiency of data validation procedures by validating data associated with multiple components 310 rather than data associated with each component 310 individually. Similarly, the device 305 may share data associated with a second 315 with other devices rather than data associated with each component 310.

In some examples, if the device 305 detects a failure associated with one or components 310 in a section 315, the device 305 may use data generated by other components 310 in the same section 315 to validate the data. For example, if the device 305 detects that the component 310-*a* has a failure, the device 305 may validate data generated by the component 310-*a* based on data generated by the components 310-*c* and 310-*d* which may correspond to a same aspect of an environment. Implementing aspects of the present disclosure may enable the device 305 to perform fault detection and data validation, leading to an increased reliability of services at the device 305.

Figure 4:
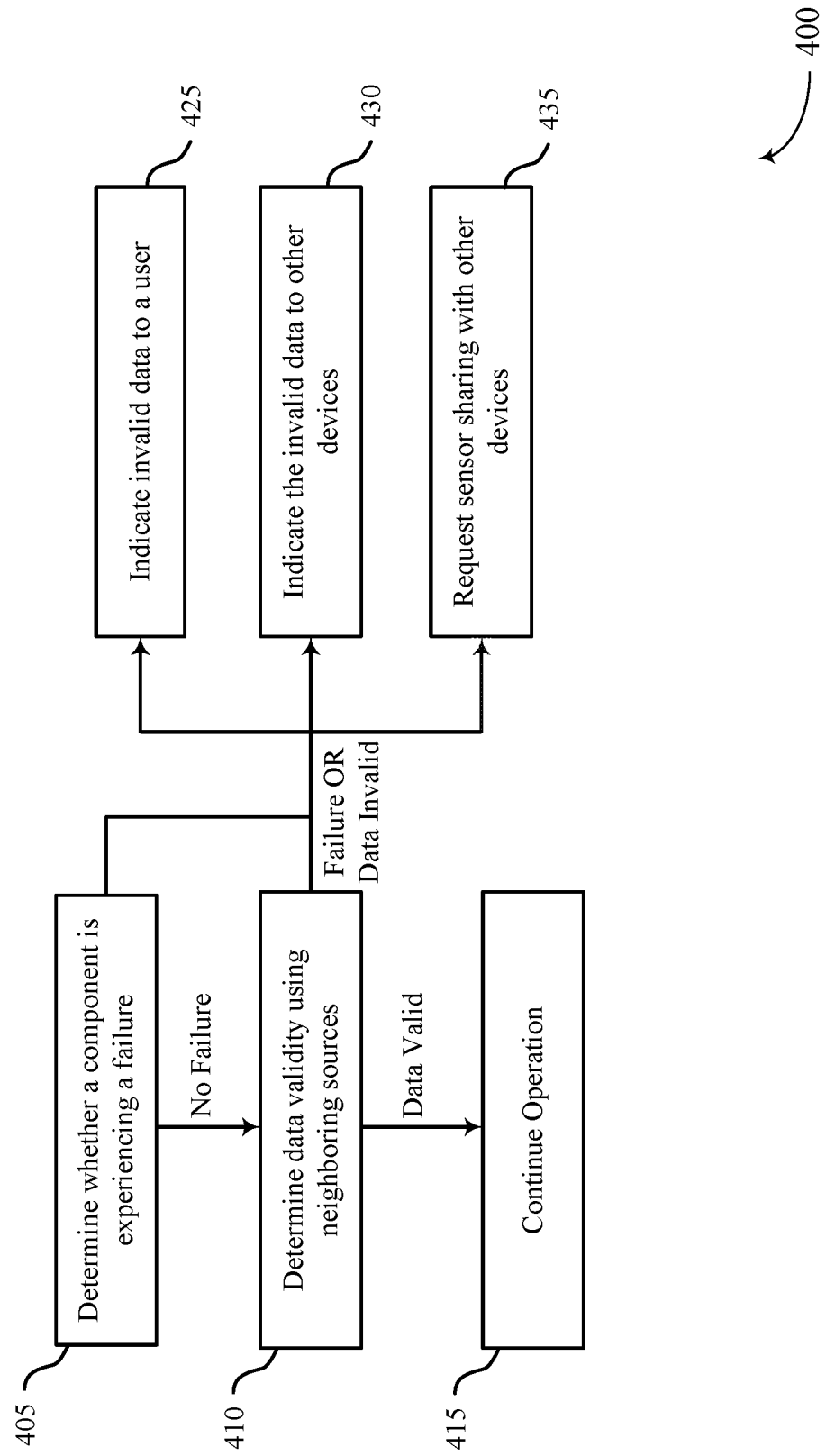
FIG. 4 illustrates an example of a process flow that supports techniques for fault detection in wireless communications systems in accordance with aspects of the present disclosure.

FIG. 4 illustrates an example of a process flow 400 that supports techniques for fault detection in wireless communications systems in accordance with aspects of the present disclosure. In some examples, the process flow 400 may implement aspects of or be implemented by a wireless communications system 100 or 200, a device 305, or any combination thereof as described with reference to FIGS. 1-3. For example, the process flow 400 may be implemented by a device operating in a V2X perceptive network. Alternative examples of the following may be implemented where some processes are performed in a different order than described or not performed at all. In some implementations, processes may include additional features not mentioned below, or further processes may be added.

At 405, a device (e.g., a first device 205 or a device 305 as described with reference to FIGS. 2 and 3) may determine whether a component at the device is experiencing a failure. For example, an electronic control unit associated with the component may determine that the component is unresponsive, is experiencing a power failure, is experiencing a loss of communications, etc. If the device does not detect a failure, the device may, at 410, determine to validate data associated with the components via data validations sessions with other devices. If the device determines that the data is valid, the device may, at 415, continue operating or communicating based on determining the data is valid.

If, however, the device determines that the data is invalid, or if the device detects a component failure, the device may, at 425, provide an indication to a user of the device that data generated at the device is invalid. Similarly, the device may, at 430 indicate the invalid data to other devices and, at 435, may request data sharing from the other devices to mitigate effects of the invalid data. Implementing aspects of the process flow 400 may allow a device to perform fault detection and data validation, leading to an increased reliability of services.

Figure 5:
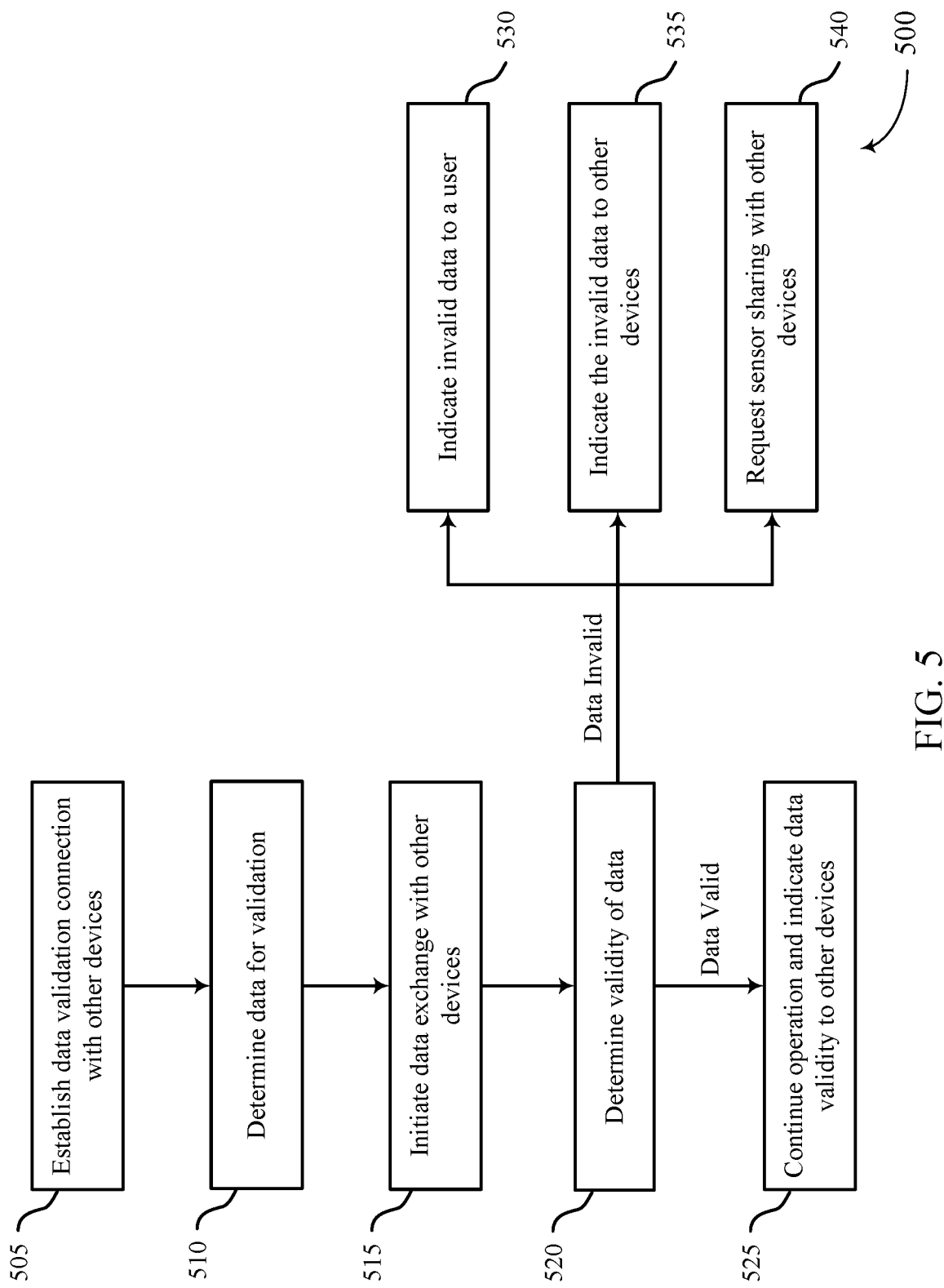
FIG. 5 illustrates an example of a process flow that supports techniques for fault detection in wireless communications systems in accordance with aspects of the present disclosure.

FIG. 5 illustrates an example of a process flow 500 that supports techniques for fault detection in wireless communications systems in accordance with aspects of the present disclosure. In some examples, the process flow 500 may implement aspects of or be implemented by a wireless communications system 100 or 200, a device 305, a process flow 400, or any combination thereof as described with reference to FIGS. 1-4. For examples, the process flow 500 may be implemented by a device operating in a V2X perceptive network. Alternative examples of the following may be implemented where some processes are performed in a different order than described or not performed at all. In some implementations, processes may include additional features not mentioned below, or further processes may be added.

At 505, a first device (e.g., a first device 205 or a device 305 as described with reference to FIGS. 2 and 3), may establish a connection with other devices in a V2X network to validate data generated at the first device. At 510, the first device may determine at least of portion of data to validate with the other devices based on a capability of the other devices to generate data corresponding to a same aspect of an environment as the portion of data.

At 515, the first device may initiate a data exchange with the other devices. For example, the first device may transmit the determined portion of data and receive corresponding data from the other devices in response. At 520, the first device may determine a validity of the portion of data based on the data received from the other devices. For example, the first device may compare the portion of data to the received data and determine whether the portion of data satisfies a threshold accuracy, latency, error rate, etc.

If the first device determines that the first portion of data is valid, the device may, at 525, provide an indication of validity to the other devices and may continue operating based on determining the data is valid.

If, however, the first device determines that the portion of data has a fault, or is invalid, the device may at 530, indicate the invalid data to a user of the first device. At 525, the first device may also indicate the invalidity to the other devices and, at 530, the first device may request to perform data sharing with the other devices to mitigate the effects of the data fault. Implementing aspects of the process flow 500 may allow a device to perform fault detection and data validation, leading to an increased reliability of services.

Figure 6:
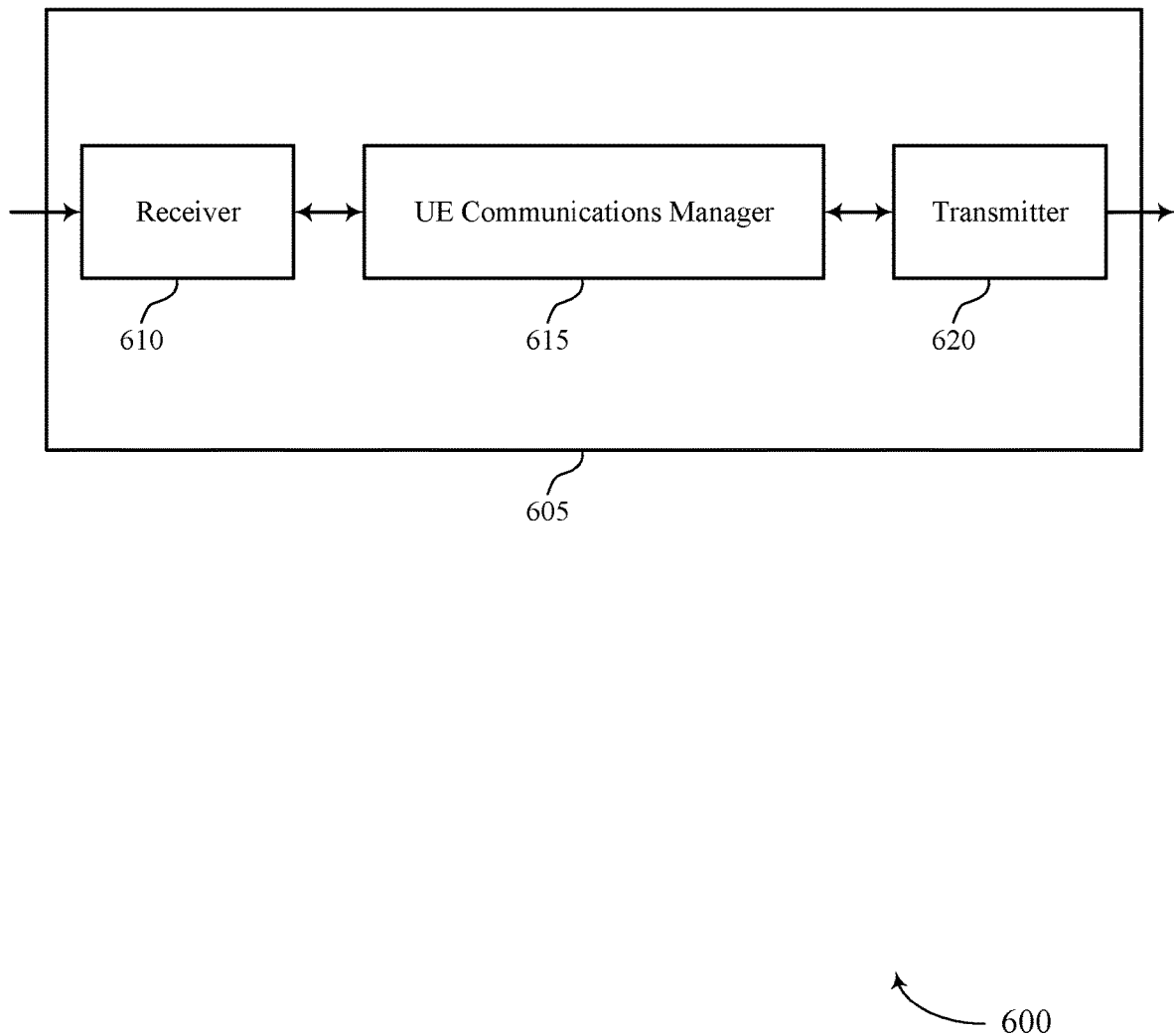
FIGS. 6 and 7 show block diagrams of device that support techniques for fault detection in wireless communications systems in accordance with aspects of the present disclosure.

FIG. 6 shows a block diagram 600 of a device 605 that supports techniques for fault detection in wireless communications systems in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to techniques for fault detection in wireless communications systems, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may generate a first set of data associated with a set of components of the first device, establish, with one or more other devices, a connection for validation of data generated at the set of components, determine at least a subset of the first set of data for validation based on a capability of the one or more other devices to generate one or more other sets of data corresponding to the first set of data, transmit the subset of the first set of data to the one or more other devices, receive, from the one or more other devices, at least one other set of data corresponding to the subset of the first set of data, and determine a validity of the subset of the first set of data in response to receiving at least the one other set of data. The UE communications manager 615 may also receive, from a second device, a first set of data generated at the second device, receive, from the second device, an indication that the first set of data is invalid, ignore the first set of data based on the indication that the first set of data is invalid, and transmit, to the second device, an indication of an availability of the first device to perform data sharing with the second device. The UE communications manager 615 may be an example of aspects of the UE communications manager 910 described herein.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

In some examples, the UE communications manager 615 may be implemented as an integrated circuit or chipset for a mobile device modem, and the receiver 610 and transmitter 620 may be implemented as analog components (e.g., amplifier, filters, antennas) coupled with the mobile device modem to enable wireless transmission and reception over one or more bands.

The UE communications manager 615 as described may be implemented to realize one or more potential advantages. One implementation may allow the device 605 to detect faults and perform data validation as part of V2X perceptive networks. Based on the techniques for performing data validation, the device 605 may exhibit improved reliability, reduced latency, or improved data reliability, among other benefits.

Figure 7:
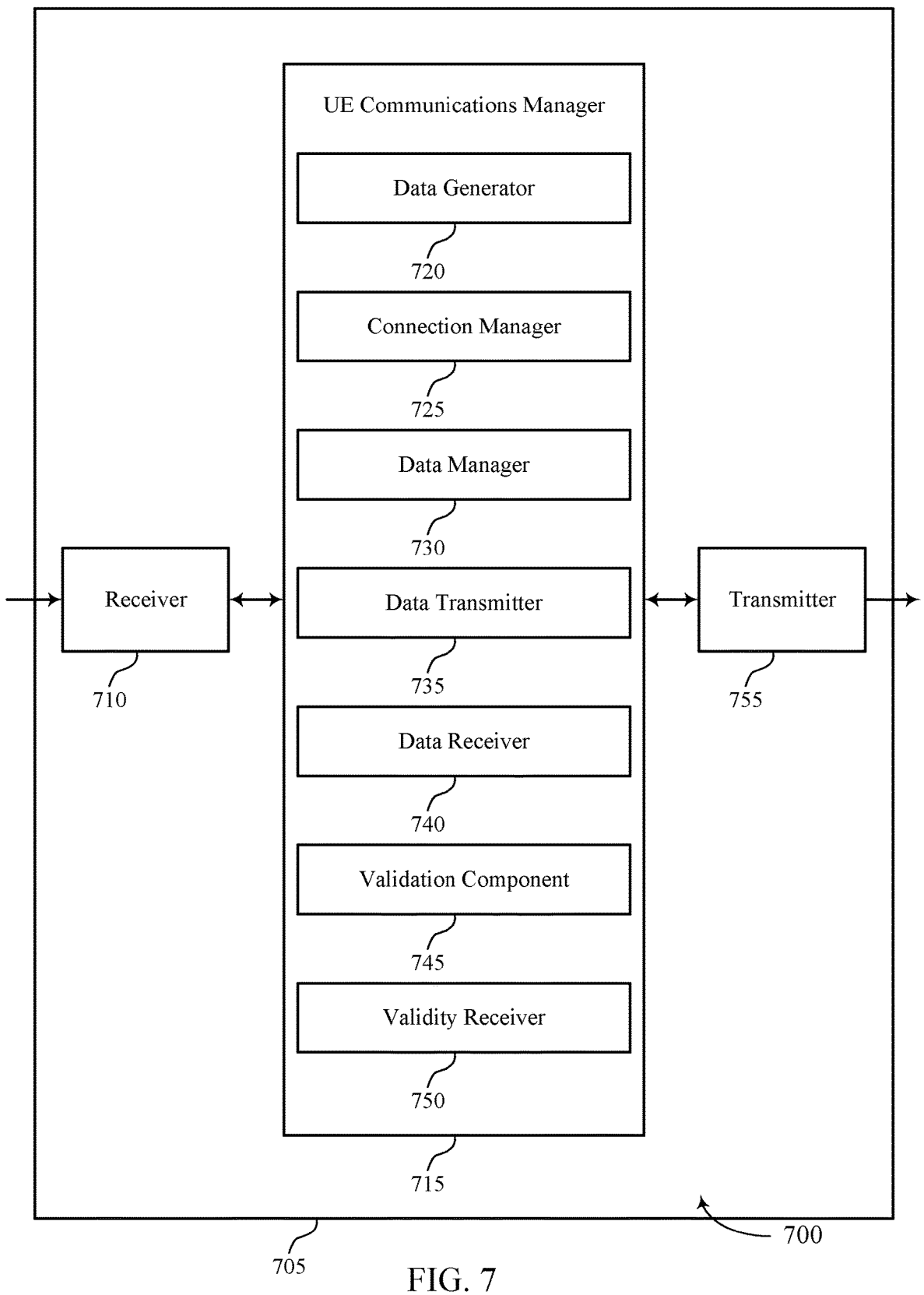

FIG. 7 shows a block diagram 700 of a device 705 that supports techniques for fault detection in wireless communications systems in accordance with aspects of the present disclosure. The device 705 may be an example of aspects of a device 605, or a UE 115 as described herein. The device 705 may include a receiver 710, a UE communications manager 715, and a transmitter 755. The device 705 may also include a processor. Each of these components may be in communication with one another (e.g., via one or more buses).

The receiver 710 may receive information such as packets, user data, or control information associated with various information channels (e.g., control channels, data channels, and information related to techniques for fault detection in wireless communications systems, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include a data generator 720, a connection manager 725, a data manager 730, a data transmitter 735, a data receiver 740, a validation component 745, and a validity receiver 750. The UE communications manager 715 may be an example of aspects of the UE communications manager 910 described herein.

The data generator 720 may generate a first set of data associated with a set of components of the first device.

The connection manager 725 may establish, with one or more other devices, a connection for validation of data generated at the set of components.

The data manager 730 may determine at least a subset of the first set of data for validation based on a capability of the one or more other devices to generate one or more other sets of data corresponding to the first set of data.

The data transmitter 735 may transmit the subset of the first set of data to the one or more other devices.

The data receiver 740 may receive, from the one or more other devices, at least one other set of data corresponding to the subset of the first set of data.

The validation component 745 may determine a validity of the subset of the first set of data in response to receiving at least the one other set of data.

The data receiver 740 may receive, from a second device, a first set of data generated at the second device.

The validity receiver 750 may receive, from the second device, an indication that the first set of data is invalid.

The data manager 730 may ignore the first set of data based on the indication that the first set of data is invalid.

The data transmitter 735 may transmit, to the second device, an indication of an availability of the first device to perform data sharing with the second device.

The transmitter 755 may transmit signals generated by other components of the device 705. In some examples, the transmitter 755 may be collocated with a receiver 710 in a transceiver component. For example, the transmitter 755 may be an example of aspects of the transceiver 920 described with reference to FIG. 9. The transmitter 755 may utilize a single antenna or a set of antennas.

Figure 8:
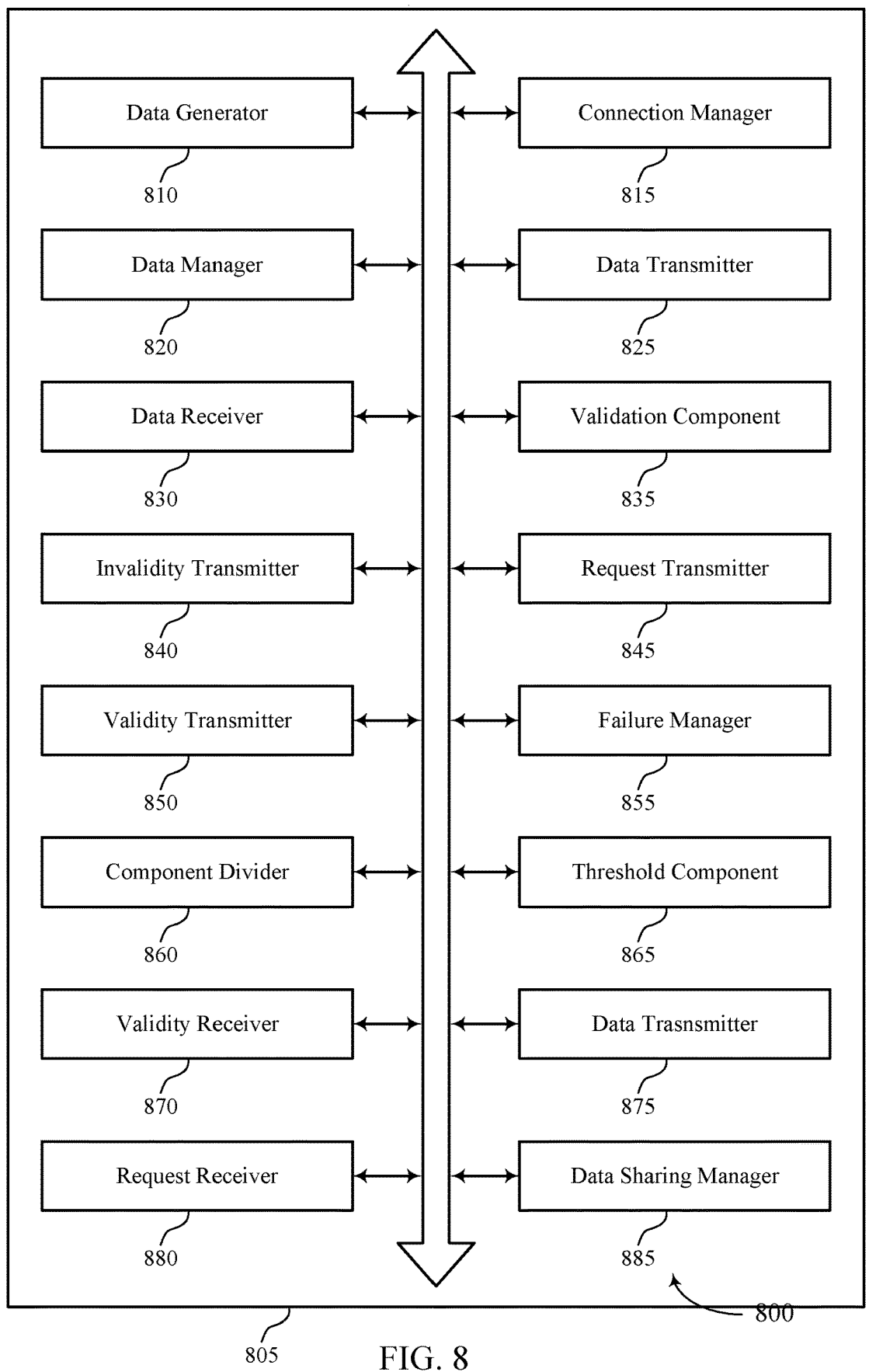
FIG. 8 shows a block diagram of a communications manager that supports techniques for fault detection in wireless communications systems in accordance with aspects of the present disclosure.

FIG. 8 shows a block diagram 800 of a UE communications manager 805 that supports techniques for fault detection in wireless communications systems in accordance with aspects of the present disclosure. The UE communications manager 805 may be an example of aspects of a UE communications manager 615, a UE communications manager 715, or a UE communications manager 910 described herein. The UE communications manager 805 may include a data generator 810, a connection manager 815, a data manager 820, a data transmitter 825, a data receiver 830, a validation component 835, an invalidity transmitter 840, a request transmitter 845, a validity transmitter 850, a failure manager 855, a component divider 860, a threshold component 865, a validity receiver 870, a data transmitter 875, a request receiver 880, and a data sharing manager 885. Each of these components may communicate, directly or indirectly, with one another (e.g., via one or more buses).

The data generator 810 may generate a first set of data associated with a set of components of the first device.

The connection manager 815 may establish, with one or more other devices, a connection for validation of data generated at the set of components. In some examples, the connection manager 815 may establish a vehicle-to-everything connection with the one or more other devices.

The data manager 820 may determine at least a subset of the first set of data for validation based on a capability of the one or more other devices to generate one or more other sets of data corresponding to the first set of data. In some examples, the data manager 820 may ignore the first set of data based on the indication that the first set of data is invalid. In some examples, the data manager 820 may determine a second set of data associated with one or more other components of the set of components, where determining the validity of the first set of data is based on the second set of data. In some examples, the data manager 820 may determine a second set of data for validating the first set of data based on a capability of the first device to validate the first set of data.

The data transmitter 825 may transmit the subset of the first set of data to the one or more other devices. In some examples, the data transmitter 825 may transmit, to the second device, an indication of an availability of the first device to perform data sharing with the second device.

The data receiver 830 may receive, from the one or more other devices, at least one other set of data corresponding to the subset of the first set of data. In some examples, the data receiver 830 may receive, from a second device, a first set of data generated at the second device.

The validation component 835 may determine a validity of the subset of the first set of data in response to receiving at least the one other set of data. In some examples, the validation component 835 may determine the first set of data is invalid. In some examples, the validation component 835 may determine the first set of data is valid.

The validity receiver 870 may receive, from the second device, an indication that the first set of data is invalid.

The invalidity transmitter 840 may transmit, to the one or more other devices, an indication that the first set of data is invalid.

The request transmitter 845 may transmit, to the one or more devices, a request to initiate data sharing.

The validity transmitter 850 may transmit, to the one or more devices, an indication that the first set of data is valid.

The failure manager 855 may determine at least one component of the set of components is experiencing a failure, where the first set of data is associated with at least the one component.

The component divider 860 may divide the set of components at the first device into one or more sets of components, where the first set of data is generated at a first set of components.

The threshold component 865 may determine whether one or more parameters associated with the first set of data satisfy a threshold. In some cases, the one or more parameters include one or more of a latency parameter or a quality of service parameter.

The data transmitter 875 may transmit the second set of data to the second device.

The request receiver 880 may receive, from the second device, a request to perform data sharing.

The data sharing manager 885 may perform data sharing with the second device in response to receiving the request.

Figure 9:
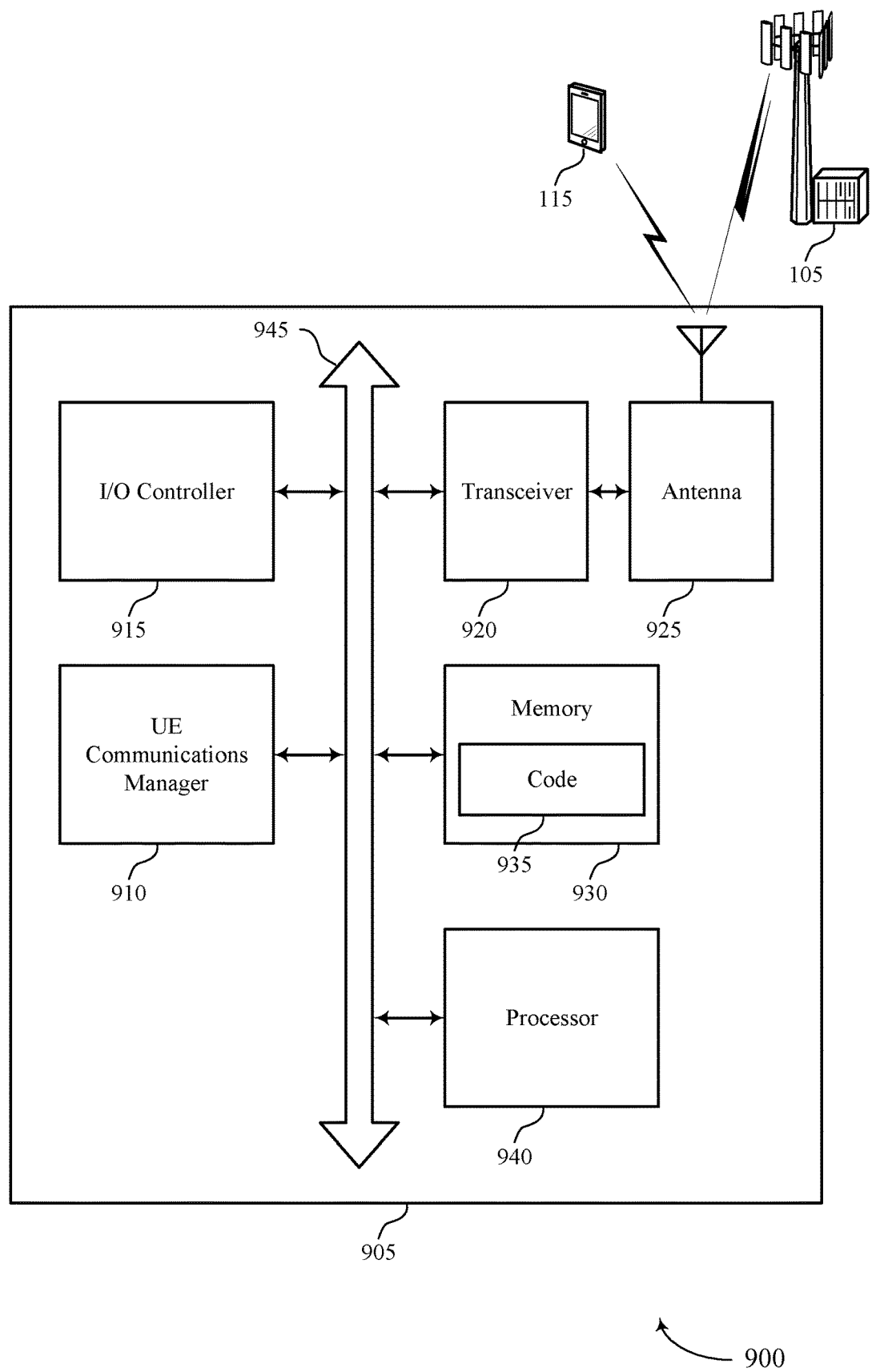
FIG. 9 shows a diagram of a system including a device that supports techniques for fault detection in wireless communications systems in accordance with aspects of the present disclosure.

FIG. 9 shows a diagram of a system 900 including a device 905 that supports techniques for fault detection in wireless communications systems in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may generate a first set of data associated with a set of components of the first device, establish, with one or more other devices, a connection for validation of data generated at the set of components, determine at least a subset of the first set of data for validation based on a capability of the one or more other devices to generate one or more other sets of data corresponding to the first set of data, transmit the subset of the first set of data to the one or more other devices, receive, from the one or more other devices, at least one other set of data corresponding to the subset of the first set of data, and determine a validity of the subset of the first set of data in response to receiving at least the one other set of data. The UE communications manager 910 may also receive, from a second device, a first set of data generated at the second device, receive, from the second device, an indication that the first set of data is invalid, ignore the first set of data based on the indication that the first set of data is invalid, and transmit, to the second device, an indication of an availability of the first device to perform data sharing with the second device.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for fault detection in wireless communications systems).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
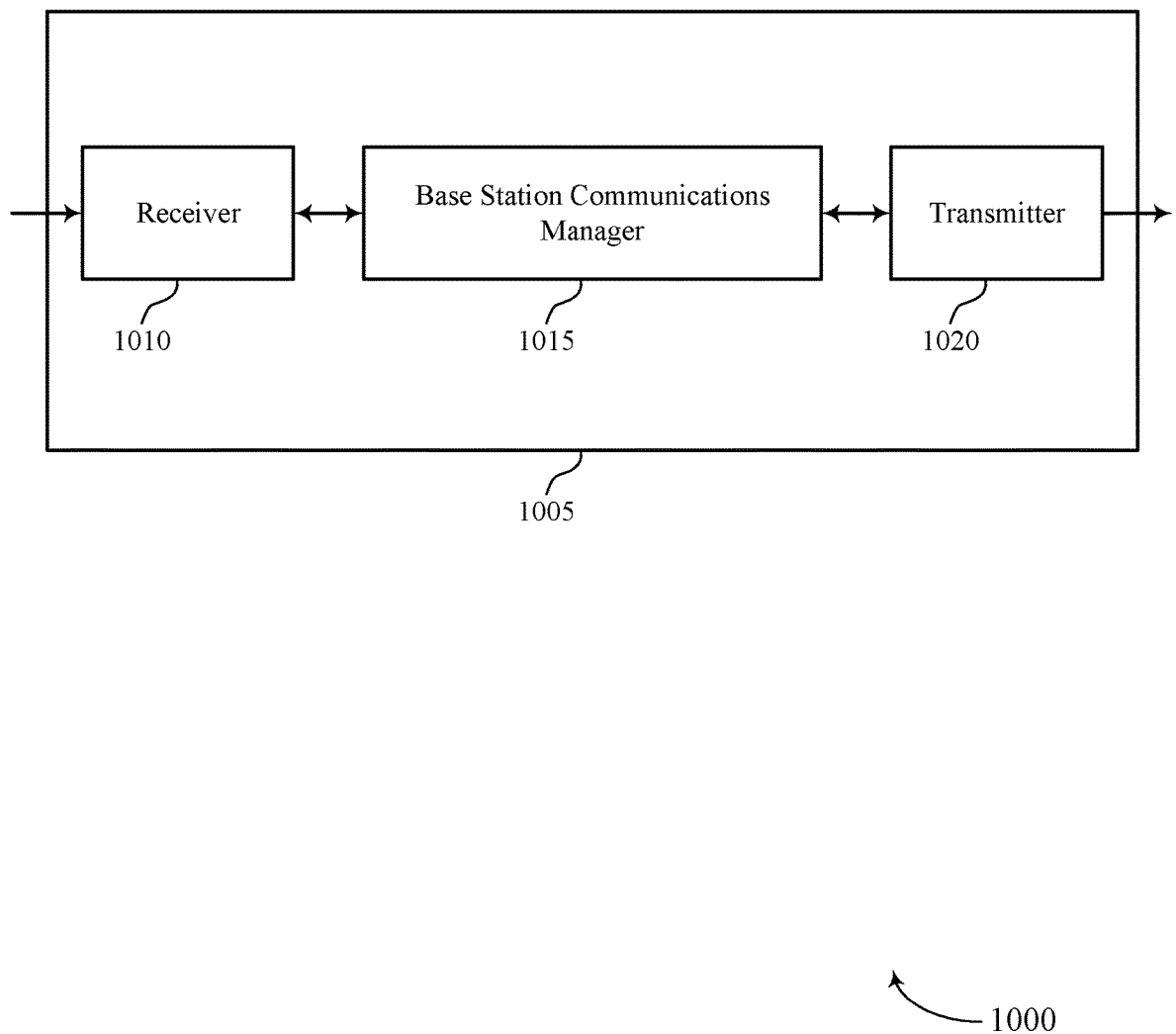
FIGS. 10 and 11 show block diagrams of devices that support techniques for fault detection in wireless communications systems in accordance with aspects of the present disclosure.

FIG. 10 shows a block diagram 1000 of a device 1005 that supports techniques for fault detection in wireless communications systems in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to techniques for fault detection in wireless communications systems, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may receive, from a second device, an indication that a first set of data generated at the second device is invalid, determine one or more other devices available for data sharing with the second device in response to receiving the indication, transmit, to the second device, an indication of an availability of the one or more other devices to perform data sharing with the second device, and transmit, to the one or more other devices, the indication that the first set of data generated at the second device is invalid and a request for the one or more other devices to perform data sharing with the second device. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
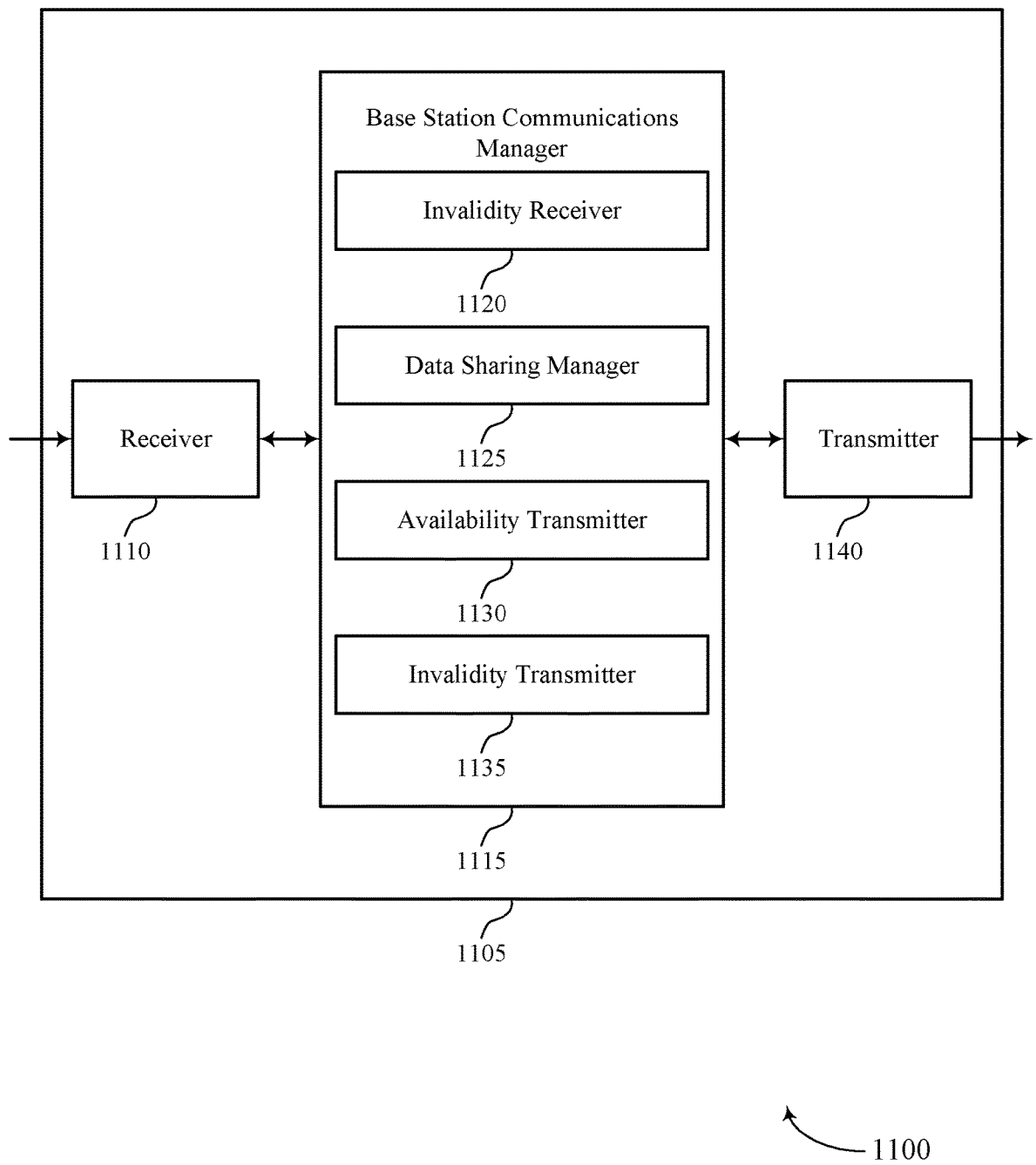

FIG. 11 shows a block diagram 1100 of a device 1105 that supports techniques for fault detection in wireless communications systems in accordance with aspects of the present disclosure. The device 1105 may be an example of aspects of a device 1005, or a base station 105 as described herein. The device 1105 may include a receiver 1110, a base station communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to techniques for fault detection in wireless communications systems, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include an invalidity receiver 1120, a data sharing manager 1125, an availability transmitter 1130, and an invalidity transmitter 1135. The base station communications manager 1115 may be an example of aspects of the base station communications manager 1310 described herein.

The invalidity receiver 1120 may receive, from a second device, an indication that a first set of data generated at the second device is invalid.

The data sharing manager 1125 may determine one or more other devices available for data sharing with the second device in response to receiving the indication.

The availability transmitter 1130 may transmit, to the second device, an indication of an availability of the one or more other devices to perform data sharing with the second device.

The invalidity transmitter 1135 may transmit, to the one or more other devices, the indication that the first set of data generated at the second device is invalid and a request for the one or more other devices to perform data sharing with the second device.

The transmitter 1140 may transmit signals generated by other components of the device 1105. In some examples, the transmitter 1140 may be collocated with a receiver 1110 in a transceiver component. For example, the transmitter 1140 may be an example of aspects of the transceiver 1320 described with reference to FIG. 13. The transmitter 1140 may utilize a single antenna or a set of antennas.

Figure 12:
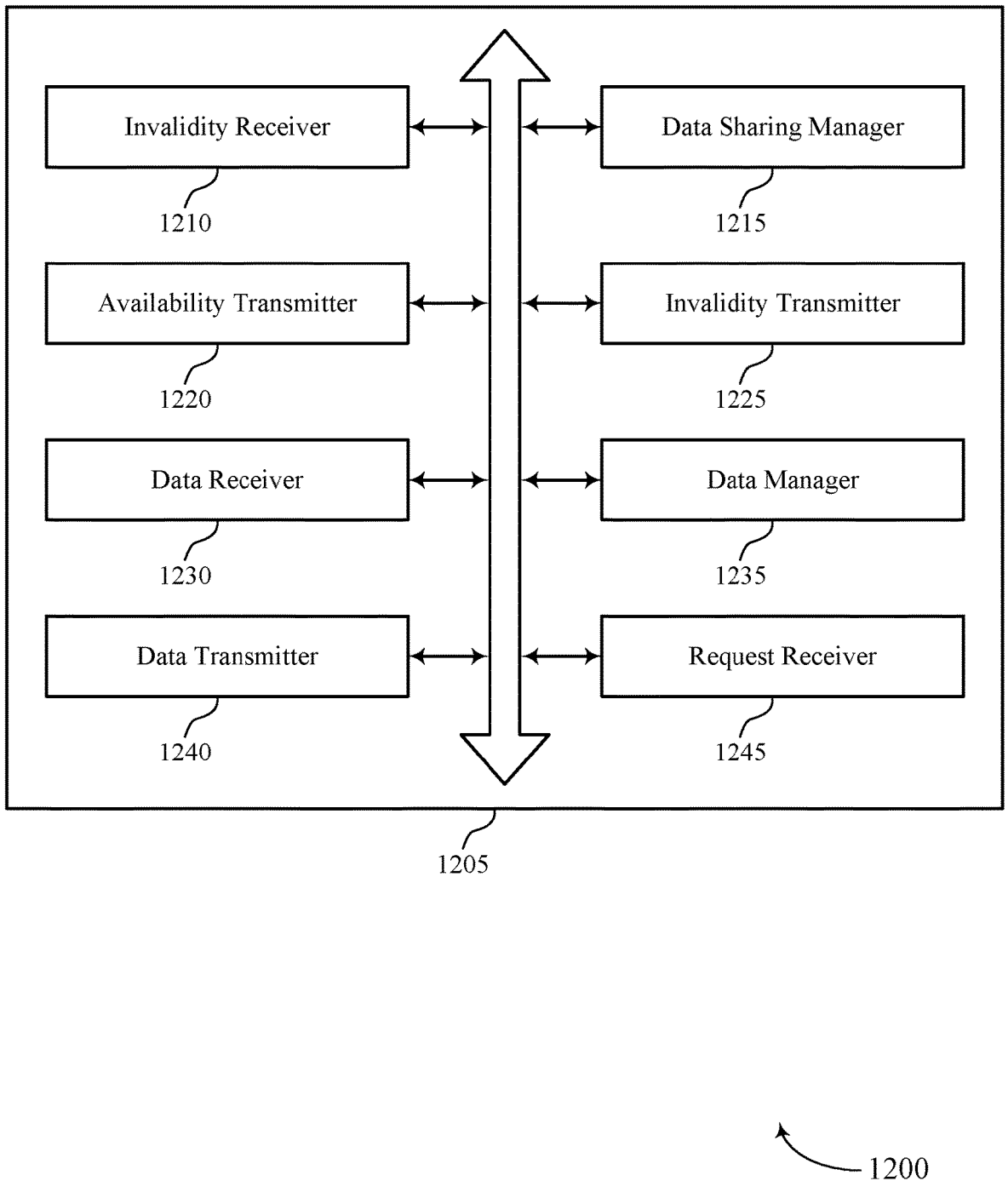
FIG. 12 shows a block diagram of a communications manager that supports techniques for fault detection in wireless communications systems in accordance with aspects of the present disclosure.

FIG. 12 shows a block diagram 1200 of a base station communications manager 1205 that supports techniques for fault detection in wireless communications systems in accordance with aspects of the present disclosure. The base station communications manager 1205 may be an example of aspects of a base station communications manager 1015, a base station communications manager 1115, or a base station communications manager 1310 described herein. The base station communications manager 1205 may include an invalidity receiver 1210, a data sharing manager 1215, an availability transmitter 1220, an invalidity transmitter 1225, a data receiver 1230, a data manager 1235, a data transmitter 1240, and a request receiver 1245. Each of these components may communicate, directly or indirectly, with one another (e.g., via one or more buses).

The invalidity receiver 1210 may receive, from a second device, an indication that a first set of data generated at the second device is invalid.

The data sharing manager 1215 may determine one or more other devices available for data sharing with the second device in response to receiving the indication. In some examples, the data sharing manager 1215 may perform data sharing with the second device in response to receiving the request.

The availability transmitter 1220 may transmit, to the second device, an indication of an availability of the one or more other devices to perform data sharing with the second device.

The invalidity transmitter 1225 may transmit, to the one or more other devices, the indication that the first set of data generated at the second device is invalid and a request for the one or more other devices to perform data sharing with the second device.

The data receiver 1230 may receive the first set of data from the second device.

The data manager 1235 may determine a second set of data for validating the first set of data based on a capability of the first device to validate the first set of data.

The data transmitter 1240 may transmit the second set of data to the second device.

The request receiver 1245 may receive, from the second device, a request to perform data sharing.

Figure 13:
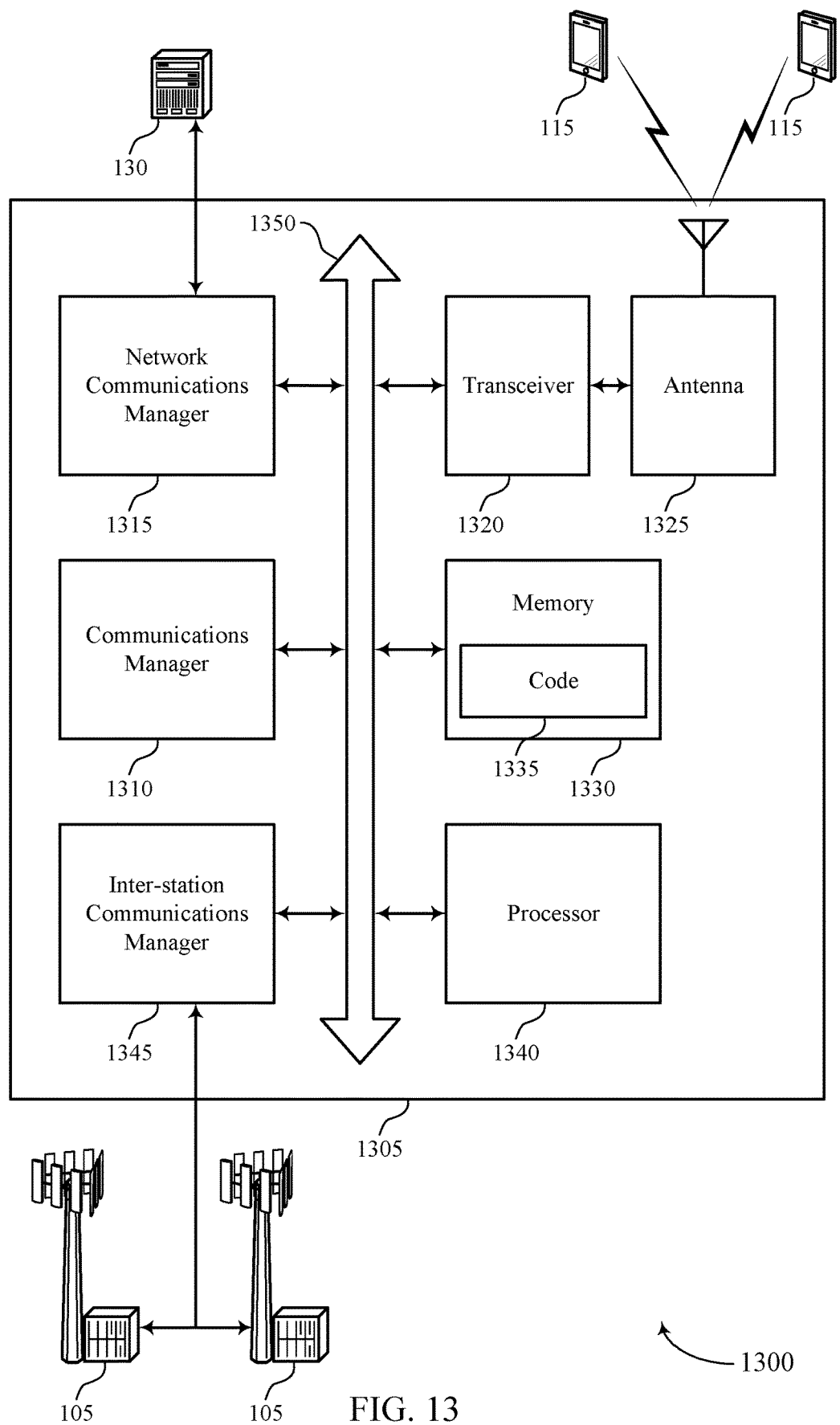
FIG. 13 shows a diagram of a system including a device that supports techniques for fault detection in wireless communications systems in accordance with aspects of the present disclosure.

FIG. 13 shows a diagram of a system 1300 including a device 1305 that supports techniques for fault detection in wireless communications systems in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may receive, from a second device, an indication that a first set of data generated at the second device is invalid, determine one or more other devices available for data sharing with the second device in response to receiving the indication, transmit, to the second device, an indication of an availability of the one or more other devices to perform data sharing with the second device, and transmit, to the one or more other devices, the indication that the first set of data generated at the second device is invalid and a request for the one or more other devices to perform data sharing with the second device.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting techniques for fault detection in wireless communications systems).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
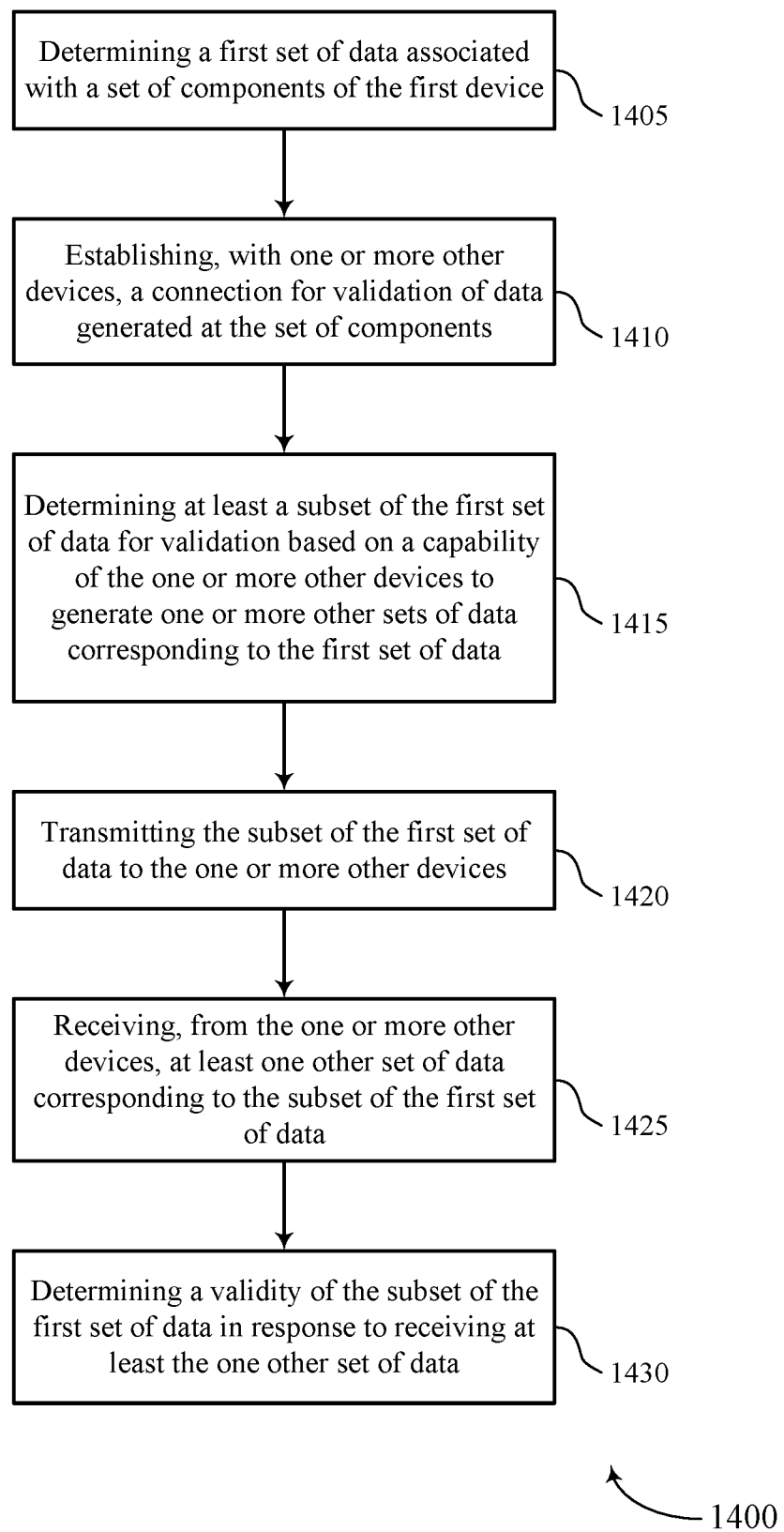
FIGS. 14 through 18 show flowcharts illustrating methods that support techniques for fault detection in wireless communications systems in accordance with aspects of the present disclosure.

FIG. 14 shows a flowchart illustrating a method 1400 that supports techniques for fault detection in wireless communications systems in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may generate a first set of data associated with a set of components of the first device. The operations of 1405 may be performed according to the methods described herein. In some examples, aspects of the operations of 1405 may be performed by a Data Generator as described with reference to FIGS. 6 through 9.

At 1410, the UE may establish, with one or more other devices, a connection for validation of data generated at the set of components. The operations of 1410 may be performed according to the methods described herein. In some examples, aspects of the operations of 1410 may be performed by a Connection Manager as described with reference to FIGS. 6 through 9.

At 1415, the UE may determine at least a subset of the first set of data for validation based on a capability of the one or more other devices to generate one or more other sets of data corresponding to the first set of data. The operations of 1415 may be performed according to the methods described herein. In some examples, aspects of the operations of 1415 may be performed by a Data Manager as described with reference to FIGS. 6 through 9.

At 1420, the UE may transmit the subset of the first set of data to the one or more other devices. The operations of 1420 may be performed according to the methods described herein. In some examples, aspects of the operations of 1420 may be performed by a Data Transmitter as described with reference to FIGS. 6 through 9.

At 1425, the UE may receive, from the one or more other devices, at least one other set of data corresponding to the subset of the first set of data. The operations of 1425 may be performed according to the methods described herein. In some examples, aspects of the operations of 1425 may be performed by a Data Receiver as described with reference to FIGS. 6 through 9.

At 1430, the UE may determine a validity of the subset of the first set of data in response to receiving at least the one other set of data. The operations of 1430 may be performed according to the methods described herein. In some examples, aspects of the operations of 1430 may be performed by a Validation Component as described with reference to FIGS. 6 through 9.

Figure 15:
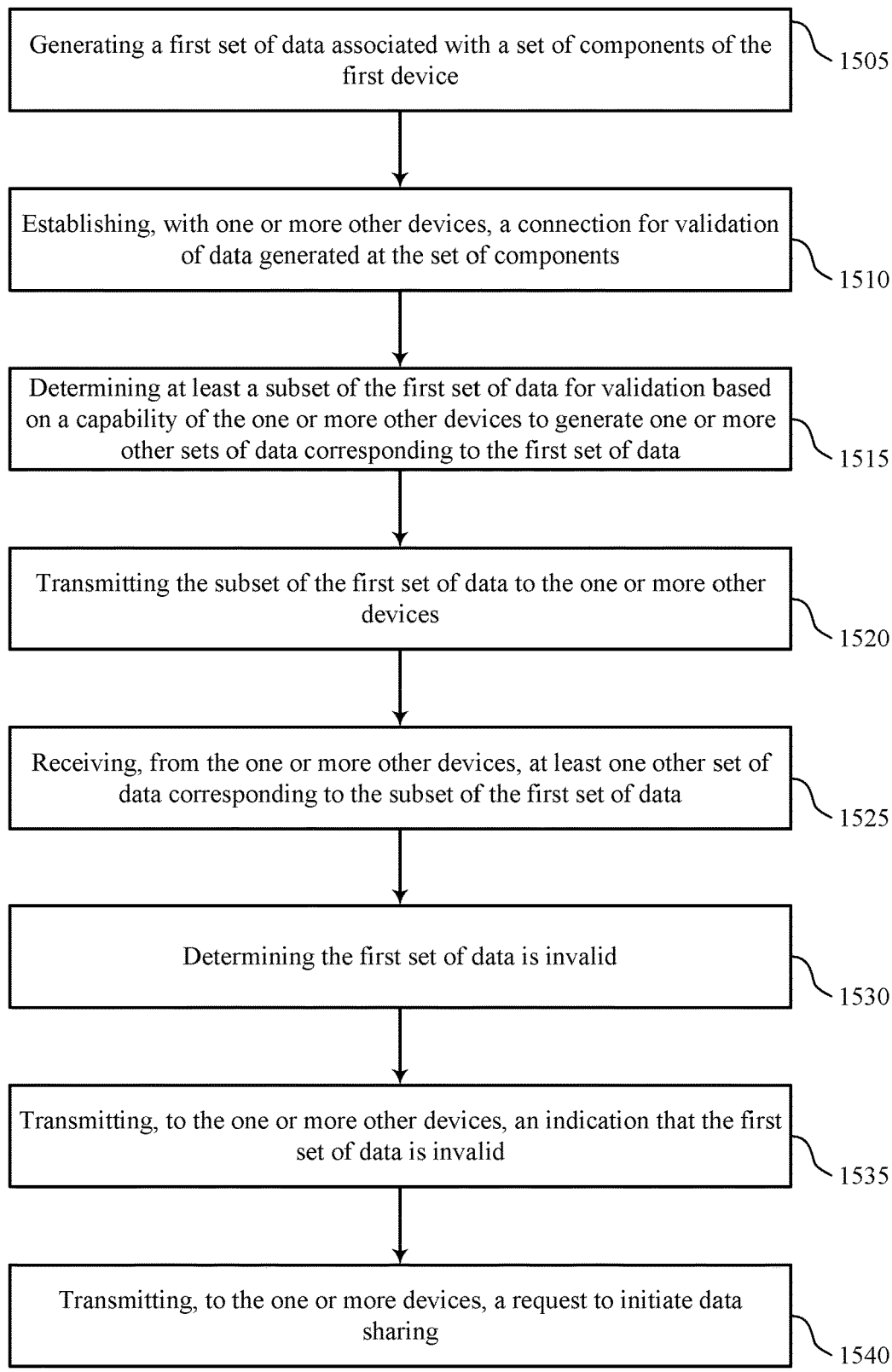

FIG. 15 shows a flowchart illustrating a method 1500 that supports techniques for fault detection in wireless communications systems in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may generate a first set of data associated with a set of components of the first device. The operations of 1505 may be performed according to the methods described herein. In some examples, aspects of the operations of 1505 may be performed by a Data Generator as described with reference to FIGS. 6 through 9.

At 1510, the UE may establish, with one or more other devices, a connection for validation of data generated at the set of components. The operations of 1510 may be performed according to the methods described herein. In some examples, aspects of the operations of 1510 may be performed by a Connection Manager as described with reference to FIGS. 6 through 9.

At 1515, the UE may determine at least a subset of the first set of data for validation based on a capability of the one or more other devices to generate one or more other sets of data corresponding to the first set of data. The operations of 1515 may be performed according to the methods described herein. In some examples, aspects of the operations of 1515 may be performed by a Data Manager as described with reference to FIGS. 6 through 9.

At 1520, the UE may transmit the subset of the first set of data to the one or more other devices. The operations of 1520 may be performed according to the methods described herein. In some examples, aspects of the operations of 1520 may be performed by a Data Transmitter as described with reference to FIGS. 6 through 9.

At 1525, the UE may receive, from the one or more other devices, at least one other set of data corresponding to the subset of the first set of data. The operations of 1525 may be performed according to the methods described herein. In some examples, aspects of the operations of 1525 may be performed by a Data Receiver as described with reference to FIGS. 6 through 9.

At 1530, the UE may determine the first set of data is invalid in response to receiving at the one other set of data. The operations of 1535 may be performed according to the methods described herein. In some examples, aspects of the operations of 1535 may be performed by a Validation Component as described with reference to FIGS. 6 through 9.

At 1535, the UE may transmit, to the one or more other devices, an indication that the first set of data is invalid. The operations of 1540 may be performed according to the methods described herein. In some examples, aspects of the operations of 1540 may be performed by an Invalidity Transmitter as described with reference to FIGS. 6 through 9.

At 1540, the UE may transmit, to the one or more devices, a request to initiate data sharing. The operations of 1545 may be performed according to the methods described herein. In some examples, aspects of the operations of 1545 may be performed by a Request Transmitter as described with reference to FIGS. 6 through 9.

Figure 16:
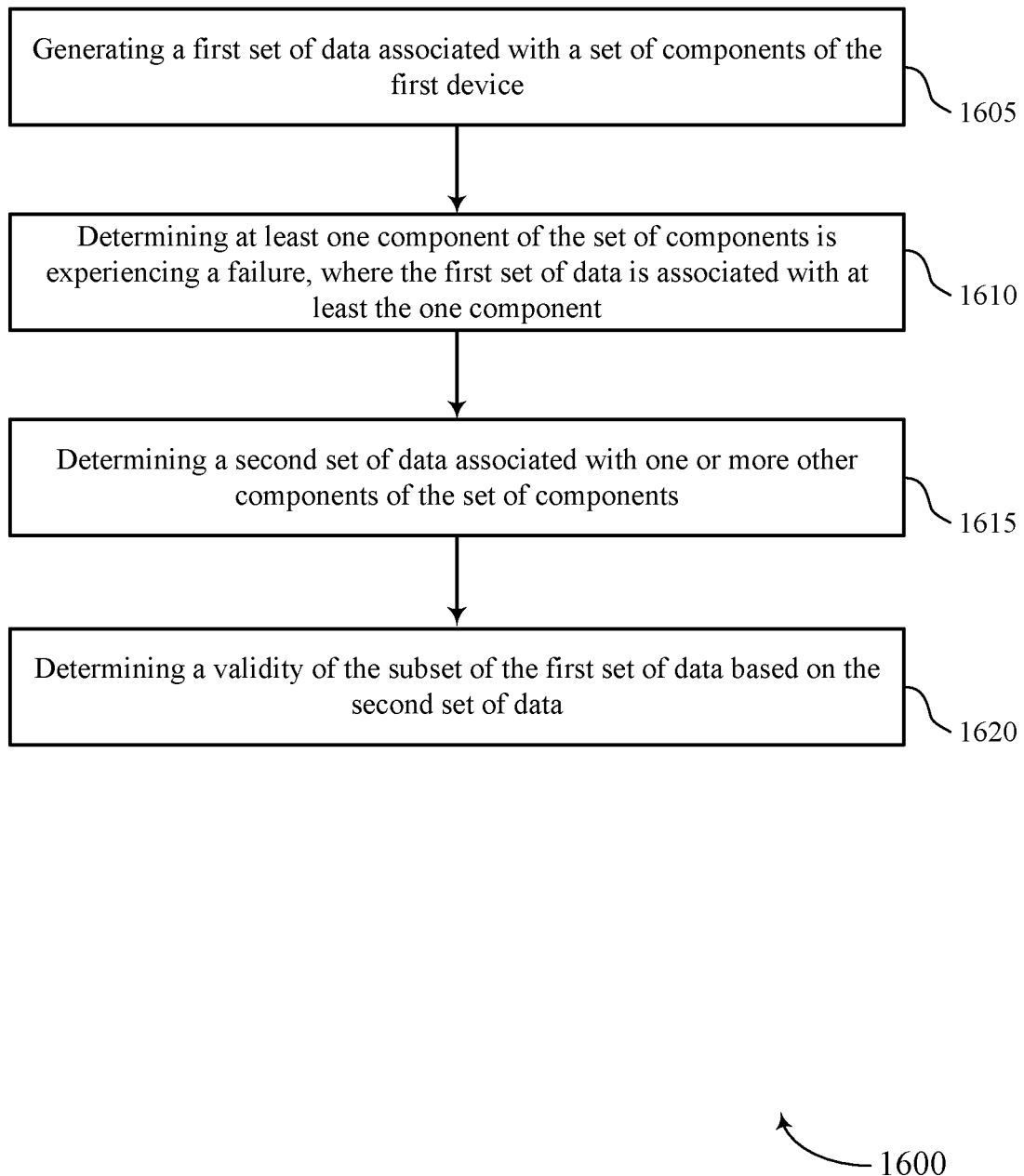

FIG. 16 shows a flowchart illustrating a method 1600 that supports techniques for fault detection in wireless communications systems in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may generate a first set of data associated with a set of components of the first device. The operations of 1605 may be performed according to the methods described herein. In some examples, aspects of the operations of 1605 may be performed by a Data Generator as described with reference to FIGS. 6 through 9.

At 1610, the UE may determine at least one component of the set of components is experiencing a failure, where the first set of data is associated with at least the one component. The operations of 1635 may be performed according to the methods described herein. In some examples, aspects of the operations of 1635 may be performed by a Failure Manager as described with reference to FIGS. 6 through 9.

At 1615, the UE may determine a second set of data associated with one or more other components of the set of components. The operations of 1640 may be performed according to the methods described herein. In some examples, aspects of the operations of 1640 may be performed by a Data Manager as described with reference to FIGS. 6 through 9.

At 1620, the UE may determine a validity of the subset of the first set of data based on the second set of data. The operations of 1630 may be performed according to the methods described herein. In some examples, aspects of the operations of 1630 may be performed by a Validation Component as described with reference to FIGS. 6 through 9.

Figure 17:
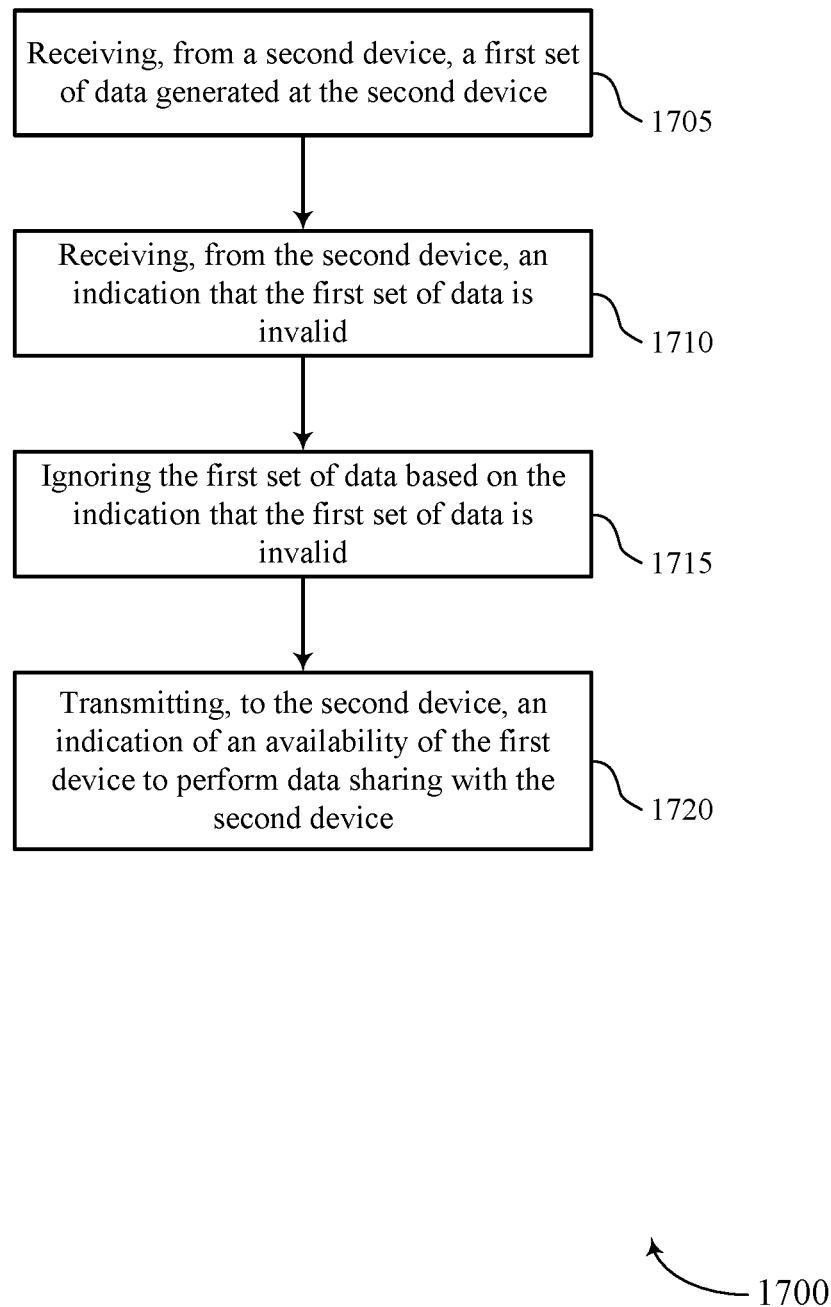

FIG. 17 shows a flowchart illustrating a method 1700 that supports techniques for fault detection in wireless communications systems in accordance with aspects of the present disclosure. The operations of method 1700 may be implemented by a UE 115 or its components as described herein. For example, the operations of method 1700 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1705, the UE may receive, from a second device, a first set of data generated at the second device. The operations of 1705 may be performed according to the methods described herein. In some examples, aspects of the operations of 1705 may be performed by a Data Receiver as described with reference to FIGS. 6 through 9.

At 1710, the UE may receive, from the second device, an indication that the first set of data is invalid. The operations of 1710 may be performed according to the methods described herein. In some examples, aspects of the operations of 1710 may be performed by a Validity Receiver as described with reference to FIGS. 6 through 9.

At 1715, the UE may ignore the first set of data based on the indication that the first set of data is invalid. The operations of 1715 may be performed according to the methods described herein. In some examples, aspects of the operations of 1715 may be performed by a Data Manager as described with reference to FIGS. 6 through 9.

At 1720, the UE may transmit, to the second device, an indication of an availability of the first device to perform data sharing with the second device. The operations of 1720 may be performed according to the methods described herein. In some examples, aspects of the operations of 1720 may be performed by a Data Transmitter as described with reference to FIGS. 6 through 9.

Figure 18:
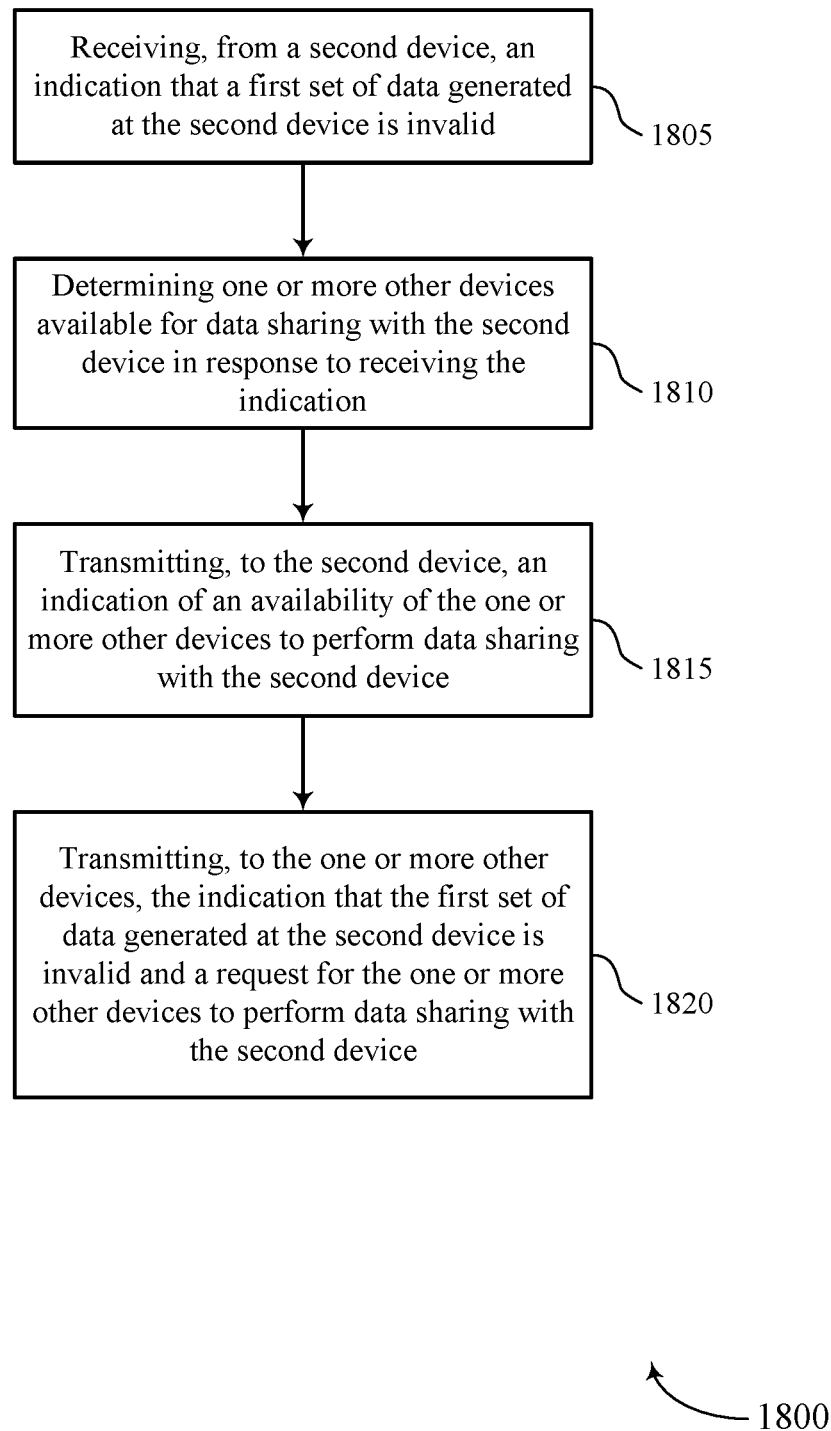

FIG. 18 shows a flowchart illustrating a method 1800 that supports techniques for fault detection in wireless communications systems in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may receive, from a second device, an indication that a first set of data generated at the second device is invalid. The operations of 1805 may be performed according to the methods described herein. In some examples, aspects of the operations of 1805 may be performed by an Invalidity Receiver as described with reference to FIGS. 10 through 13.

At 1810, the base station may determine one or more other devices available for data sharing with the second device in response to receiving the indication. The operations of 1810 may be performed according to the methods described herein. In some examples, aspects of the operations of 1810 may be performed by a Data Sharing Manager as described with reference to FIGS. 10 through 13.

At 1815, the base station may transmit, to the second device, an indication of an availability of the one or more other devices to perform data sharing with the second device. The operations of 1815 may be performed according to the methods described herein. In some examples, aspects of the operations of 1815 may be performed by an Availability Transmitter as described with reference to FIGS. 10 through 13.

At 1820, the base station may transmit, to the one or more other devices, the indication that the first set of data generated at the second device is invalid and a request for the one or more other devices to perform data sharing with the second device. The operations of 1820 may be performed according to the methods described herein. In some examples, aspects of the operations of 1820 may be performed by an Invalidity Transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first device, comprising:
generating a first set of data associated with a plurality of components of the first device;
establishing, with one or more other devices, a wireless connection for validation of data generated at the plurality of components;
determining at least a subset of the first set of data for validation based at least in part on a capability of the one or more other devices to generate one or more other sets of data corresponding to the first set of data;
transmitting the subset of the first set of data to the one or more other devices;
receiving, from the one or more other devices, at least one other set of data corresponding to the subset of the first set of data;
determining at least one component of the plurality of components is experiencing a failure, wherein the first set of data is associated with the at least one component;
determining a second set of data associated with one or more other components of the plurality of components; and
determining a validity of the subset of the first set of data in response to receiving the at least one other set of data and the second set of data.

2. The method of claim 1, further comprising:
determining the first set of data is invalid;
transmitting, to the one or more other devices, an indication that the first set of data is invalid; and
transmitting, to the one or more other devices, a request to initiate data sharing.

3. The method of claim 1, further comprising:
determining the first set of data is valid; and
transmitting, to the one or more other devices, an indication that the first set of data is valid.

4. The method of claim 1, further comprising:
dividing the plurality of components at the first device into one or more sets of components, wherein the first set of data is generated at a first set of components.

5. The method of claim 1, wherein determining the validity of the first set of data comprises:
determining whether one or more parameters associated with the first set of data satisfy a threshold.

6. The method of claim 5, wherein the one or more parameters comprise one or more of a latency parameter or a quality of service parameter.

7. The method of claim 1, wherein establishing the wireless connection comprises:
establishing a vehicle-to-everything connection with the one or more other devices.

8. An apparatus for wireless communications at a first device, comprising:
one or more processors,
one or more memories coupled with the one or more processors; and
instructions stored in the one or more memories and executable by one or more processors to cause the apparatus to:
generate a first set of data associated with a plurality of components of the first device;
establish, with one or more other devices, a wireless connection for validation of data generated at the plurality of components;
determine at least a subset of the first set of data for validation based at least in part on a capability of the one or more other devices to generate one or more other sets of data corresponding to the first set of data;
transmit the subset of the first set of data to the one or more other devices;
receive, from the one or more other devices, at least one other set of data corresponding to the subset of the first set of data;
determine at least one component of the plurality of components is experiencing a failure, wherein the first set of data is associated with the at least one component;
determine a second set of data associated with one or more other components of the plurality of components; and
determine a validity of the subset of the first set of data in response to receiving the at least one other set of data and the second set of data.

9. The apparatus of claim 8, wherein the instructions are further executable by the one or more processors to cause the apparatus to:
determine the first set of data is invalid;
transmit, to the one or more other devices, an indication that the first set of data is invalid; and
transmit, to the one or more other devices, a request to initiate data sharing.

10. The apparatus of claim 8, wherein the instructions are further executable by the one or more processors to cause the apparatus to:
determine the first set of data is valid; and
transmit, to the one or more other devices, an indication that the first set of data is valid.

11. The apparatus of claim 8, wherein the instructions are further executable by the one or more processors to cause the apparatus to:
divide the plurality of components at the first device into one or more sets of components, wherein the first set of data is generated at a first set of components.

12. The apparatus of claim 8, wherein the instructions to determine the validity of the first set of data are executable by the one or more processors to cause the apparatus to:
determine whether one or more parameters associated with the first set of data satisfy a threshold.

13. The apparatus of claim 12, wherein the one or more parameters comprise one or more of a latency parameter or a quality of service parameter.

14. The apparatus of claim 8, wherein the instructions to establish the wireless connection are executable by the one or more processors to cause the apparatus to:
establish a vehicle-to-everything connection with the one or more other devices.

15. An apparatus for wireless communications at a first device, comprising:
means for generating a first set of data associated with a plurality of components of the first device;
means for establishing, with one or more other devices, a wireless connection for validation of data generated at the plurality of components;
means for determining at least a subset of the first set of data for validation based at least in part on a capability of the one or more other devices to generate one or more other sets of data corresponding to the first set of data;

means for transmitting the subset of the first set of data to the one or more other devices;

means for receiving, from the one or more other devices, at least one other set of data corresponding to the subset of the first set of data;

means for determining at least one component of the plurality of components is experiencing a failure, wherein the first set of data is associated with the at least one component;

means for determining a second set of data associated with one or more other components of the plurality of components; and means for determining a validity of the subset of the first set of data in response to receiving the at least one other set of data and the second set of data.

16. The apparatus of claim 15, further comprising:
means for determining the first set of data is invalid;
means for transmitting, to the one or more other devices, an indication that the first set of data is invalid; and
means for transmitting, to the one or more other devices, a request to initiate data sharing.

17. The apparatus of claim 15, further comprising:
means for determining the first set of data is valid; and
means for transmitting, to the one or more other devices, an indication that the first set of data is valid.

18. The apparatus of claim 15, further comprising:
means for dividing the plurality of components at the first device into one or more sets of components, wherein the first set of data is generated at a first set of components.

19. The apparatus of claim 15, wherein the means for determining the validity of the first set of data comprises:
means for determining whether one or more parameters associated with the first set of data satisfy a threshold.

* * * * *